(12) United States Patent
Trajkovska-Broach et al.

(10) Patent No.: US 10,359,679 B2
(45) Date of Patent: Jul. 23, 2019

(54) ELECTROCHROMIC MATERIALS AND OPTICAL SYSTEMS EMPLOYING THE SAME

(71) Applicant: Mitsui Chemicals, Inc.

(72) Inventors: Anita Trajkovska-Broach, Christiansburg, VA (US); Amitava Gupta, Roanoke, VA (US); William Kokonaski, Gig Harbor, WA (US); Ronald D. Blum, Roanoke, VA (US)

(73) Assignee: Mitsui Chemicals, Inc., Tokyo (JP)

( * ) Notice: Subject to any disclaimer, the term of this patent is extended or adjusted under 35 U.S.C. 154(b) by 130 days.

(21) Appl. No.: 15/474,952

(22) Filed: Mar. 30, 2017

(65) Prior Publication Data

US 2017/0205680 A1     Jul. 20, 2017

Related U.S. Application Data

(63) Continuation of application No. 14/332,180, filed on Jul. 15, 2014, now abandoned, which is a continuation-in-part of application No. 13/849,216, filed on Mar. 22, 2013, now abandoned.

(60) Provisional application No. 61/846,312, filed on Jul. 15, 2013, provisional application No. 61/694,798, filed on Aug. 30, 2012, provisional application No. (Continued)

(51) Int. Cl.
| G02F 1/1523 | (2019.01) |
| G02F 1/153 | (2006.01) |
| G02C 7/10 | (2006.01) |
| G02F 1/157 | (2006.01) |
| G02F 1/1524 | (2019.01) |

(52) U.S. Cl.
CPC .......... *G02F 1/1523* (2013.01); *G02C 7/101* (2013.01); *G02F 1/153* (2013.01); *G02F 1/1525* (2013.01); *G02F 1/157* (2013.01); *G02F 1/15245* (2019.01); *G02F 2202/36* (2013.01)

(58) Field of Classification Search
CPC .......... G02F 1/1523; G02F 2001/1675; G02F 1/167; G02F 1/03; G02C 7/101; G02C 7/083; G02B 26/026; G02B 26/00; G02B 26/08
USPC .................... 351/159.39–159.4, 44
See application file for complete search history.

(56) References Cited

U.S. PATENT DOCUMENTS

| 6,768,574 B2 | 7/2004 | Bertran Serra et al. |
| 7,428,090 B2 | 9/2008 | Fukazawa et al. |

(Continued)

OTHER PUBLICATIONS

Duluard, "Study and set-up of Ionic Liquid Based Electrolytic Membranes for Flexible Electrochromic Devices," Nov. 21, 2008, 244 pages.

(Continued)

*Primary Examiner* — Kristina M Deherrera
(74) *Attorney, Agent, or Firm* — Sterne, Kessler, Goldstein & Fox P.L.L.C.

(57) ABSTRACT

Devices and methods related generally to electrochromic materials and their use. In some embodiments, the electrochromic materials are for use on an optical substrate, such as a lens, a semi-finished lens blank, and the like. Some embodiments include an electrochromic stack including nanostructured materials. Some embodiments include an electrochromic stack including nanostructured electrochromic materials. Some embodiments include one or more ion-conducting layers. Methods of making electrochromic (Continued)

stacks having nanostructured materials and/or ion-conducting layers are also discussed.

19 Claims, 16 Drawing Sheets

Related U.S. Application Data

61/668,113, filed on Jul. 5, 2012, provisional application No. 61/615,621, filed on Mar. 26, 2012.

(56) References Cited

U.S. PATENT DOCUMENTS

| | | |
|---|---|---|
| 8,982,466 B2 | 3/2015 | Neuffer |
| 2003/0231371 A1 | 12/2003 | Tonar et al. |
| 2004/0056239 A1 | 3/2004 | Fitzmaurice et al. |
| 2005/0248824 A1 | 11/2005 | Fukazawa et al. |
| 2008/0169185 A1 | 7/2008 | Burdis et al. |
| 2009/0057137 A1 | 3/2009 | Pitts et al. |
| 2009/0204207 A1 | 8/2009 | Blum et al. |
| 2010/0053722 A1 | 3/2010 | Finley et al. |
| 2010/0245973 A1 | 9/2010 | Wang et al. |
| 2011/0249314 A1 | 10/2011 | Wang et al. |
| 2014/0327950 A1 | 11/2014 | Trajkovska-Broach et al. |

OTHER PUBLICATIONS

"Notification of Transmittal of the International Search Report and the Written Opinion of the International Searching Authority, or the Declaration," dated Aug. 2, 2013, International Appln. No. PCT/US2013/033561, International Filing Date: Mar. 22, 2013, 12 pages.

ELECTROCHROMIC MATERIALS AND OPTICAL SYSTEMS EMPLOYING THE SAME

CROSS-REFERENCE TO RELATED APPLICATIONS

The present application is a continuation application of U.S. patent application Ser. No. 14/332,180, filed Jul. 15, 2014, which is a continuation-in-part of U.S. patent application Ser. No. 13/849,216, filed Mar. 22, 2013, and claims the benefit of priority to U.S. Provisional Patent Application No. 61/846,312, filed Jul. 15, 2013, each of which is hereby incorporated by reference in their entirety.

U.S. patent application Ser. No. 14/332,180 also claims the benefit of priority to the following U.S. Provisional Patent Applications via U.S. patent application Ser. No. 13/849,216. U.S. Provisional Patent Application No. 61/615,621, filed Mar. 26, 2012; U.S. Provisional Patent Application No. 61/668,113, filed Jul. 5, 2012; and U.S. Provisional Patent Application No. 61/694,798, filed Aug. 30, 2012. Each of these applications is hereby incorporated by reference as though each were fully set forth herein in their entirety.

BACKGROUND OF THE INVENTION

Field of the Invention

The present invention relates generally to electro-chromic materials and their use. In some embodiments, the invention relates to electrochromic materials for use on an optical substrate, such as a lens, a semi-finished lens blank, and the like.

Background

Electrochromic coatings can be used in eyeglass lenses to provide certain benefits, including the blocking of certain wavelengths of visible or ultraviolet light. While such benefits can be achieved to a degree using photochromic materials, photochromic materials have certain disadvantages with respect to electrochromic materials. For example, electrochromic materials can be activated and deactivated when desired, whereas photochromic materials simply respond to an external stimulus, such as the degree of ambient illumination. Nevertheless, no commercially successful electrochromic eyeglasses have appeared on the market.

BRIEF SUMMARY OF THE INVENTION

Some embodiments include an electrochromic optical system, comprising: an optical substrate; and an electrochromic stack disposed on the optical substrate, wherein the electrochromic stack comprises at least five ceramic layers disposed successively on each other; wherein each of the at least five layers has a thickness of 5 to 200 nm, and at least one of the at least five ceramic layers comprises a nanostructured material.

Some embodiments include a pair of spectacles comprising: a frame; and a first lens and a second lens, each of which is disposed in the frame; wherein one or both of the first lens or second lens is an electrochromic optical system, as described above.

Some embodiments include a method of disposing one or more electrochromic layers on an optical substrate, comprising: providing an optical substrate and a glass substrate, the glass substrate having one or more electro-chromic layers disposed on a first surface; and securing the glass substrate to the optical substrate, such that the first surface of the glass substrate faces the optical substrate; wherein the securing step comprises adhering the glass substrate to the optical substrate using an adhesive layer, the adhesive layer having an index of refraction matching that of the optical substrate.

Some embodiments include a hybrid electro-chromic film, comprising a nanostructured inorganic film, the film comprising an enhancer compound; wherein the nanostructured inorganic film comprises a metal oxide; and wherein the enhancer compound is a viologen, a conductive polymer, a metal coordination complex, or Prussian blue.

Some embodiments include an electrochromic optical system including an optical substrate and an electrochromic stack disposed on the optical substrate. The electrochromic stack including a plurality of layers, where at least one layer of the plurality of layers comprises a nanostructured material.

In some embodiments, the electrochromic stack includes at least five layers. In some embodiments, each of the at least five layers has a thickness of 5 to 1000 nm. In some embodiments, the electrochromic stack includes at least four layers. In some embodiments, each of the at least four layers has a thickness of 5 to 1000 nm. In some embodiments, the electrochromic stack includes at least three layers. In some embodiments, each of the at least three layers has a thickness of 5 to 1000 nm.

In some embodiments, at least two of the layers of the plurality of layers include a nanostructured material. In some embodiments, the at least one layer including a nanostructured material has a thickness of 1 to 500 nm.

In some embodiments, the nanostructured material comprises at least one of: nanopores, nanospheres, nanograins, nanorods, nanoridges, nanoplatelets, and nanoparticles.

In some embodiments, the nanostructured material comprises an electrochromic material. In some embodiments, the electrochromic material is an electrochromic oxide selected from the group including tungsten oxide, nickel oxide, iridium oxide, molybdenum oxide, vanadium oxide, titanium oxide, chromium oxide, manganese oxide, iron oxide, cobalt oxide, rhodium oxide, tantalum oxide, niobium oxide, and combinations thereof. In some embodiments, the electrochromic material is selected from the group including nickel oxide, iridium oxide, molybdenum oxide, vanadium oxide, and combinations thereof. In some embodiments, the electrochromic material is tungsten oxide.

In some embodiments, the nanostructured material is formed of an electrochromic material. In some embodiments, the electrochromic material is an electrochromic oxide selected from the group including tungsten oxide, nickel oxide, iridium oxide, molybdenum oxide, vanadium oxide, titanium oxide, chromium oxide, manganese oxide, iron oxide, cobalt oxide, rhodium oxide, tantalum oxide, niobium oxide, and combinations thereof. In some embodiments, the electrochromic material is selected from the group including nickel oxide, iridium oxide, molybdenum oxide, vanadium oxide, and combinations thereof. In some embodiments, the electrochromic material is tungsten oxide.

In some embodiments, the electrochromic optical system also includes at least one electrolyte. In some embodiments, the electrochromic optical system also includes at least one ion-conducting layer disposed between at least one electrolyte and at least one layer comprising a nanostructured material. In some embodiments, the at least one ion-conducting layer includes a material selected from the group including lithium oxide, lithium niobate, Li-doped tungsten oxide, Li-doped nickel oxide, organic silica, and combinations thereof.

In some embodiments, the at least one ion-conducting layer is in contact with at least one layer comprising a nanostructured material. In some embodiments, the at least one ion-conducting layer in contact with at least one layer comprising a nanostructured material penetrates into the nanostructured material.

In some embodiments, the refractive index of the at least one ion-conducting layer has a value that is between the refractive index of the electrolyte and the refractive index of the nanostructured layer between which it is disposed. In some embodiments, the at least one electrolyte has a first index of refraction, the at least one ion-conducting layer has a second index of refraction, and the at least one nanostructured layer has a third index of refraction, where the difference between the first index of refraction and the second index of refraction is no greater than 0.4, and where the difference between the second index of refraction and the third index of refraction is no greater than 0.4.

Some embodiments include an electrochromic optical system including a first substrate, a second substrate, and an electrochromic stack disposed between the first substrate and the second substrate, the electrochromic stack including a first nanostructured layer including a first nanostructured material, a second nanostructured layer including a second nanostructured material, and at least one electrolyte.

In some embodiments, the electrochromic optical system also includes at least one ion-conducting layer. In some embodiments, a first ion-conducting layer is deposited over the first nanostructured layer and a second ion-conducting layer is deposited over the second nanostructured layer. In some embodiments, the at least one electrolyte is disposed between the first ion-conducting layer and the second ion-conducting layer.

In some embodiments, the electrochromic optical system includes a first electrolyte and a second electrolyte, the first electrolyte being in contact with the second electrolyte. In some embodiments, the first electrolyte penetrates into the first nanostructure material and the second electrolyte penetrates into the second nanostructured material.

In some embodiments, the first ion-conducting layer penetrates into the first nanostructured material and the second ion-conducting layer penetrates into the second nanostructured material.

In some embodiments, the at least one electrolyte is in contact with the first nanostructured layer and the second nanostructured layer. In some embodiments, the at least one electrolyte and the second nanostructured layer penetrate into the first nanostructured material.

In some embodiments, the second nanostructured material has a surface topography that conforms with a surface topography of the first nanostructured material. In some embodiments, the surface topography of the second nanostructured material is the inverse of the surface topography of the first nanostructured material.

In some embodiments, the first nanostructured layer and the second nanostructured layer each have a thickness of 1 to 500 nm.

Some embodiments include a method of making an electrochromic optical system, the method including depositing a first nanostructured layer over a first substrate, the first nanostructured layer including a first nanostructured material, depositing a second nanostructured layer over a second substrate, the second nanostructured layer including a second nanostructured material, depositing a first ion-conducting layer over the first nanostructured layer, depositing a second ion-conducting layer over the second nanostructured layer, depositing an electrolyte over at least one of: the first ion-conducting layer and the second ion-conducting layer, and assembling the first substrate and the second substrate, thereby forming the electrochromic optical system.

In some embodiments, the first ion-conducting layer penetrates into the first nanostructured material and the second ion-conducting layer penetrates into the second nanostructured material.

In some embodiments, the first ion-conducting layer and the second ion-conducting layer are deposited using at least one process selected from the group including a lithiation process, a soaking process, a sol-gel process, a vacuum-deposition process, a dip-coating process, an electro-chemical deposition process, and an electrophoretic deposition process.

In some embodiments, the first nanostructured layer and the second nanostructured layer are deposited using at least one process selected from the group including an oblique vacuum deposition process, a glancing angle deposition process, an electrophoresis process, an electro-deposition process, and an atomic layer deposition process.

In some embodiments, the first nanostructured material and the second nanostructured material are formed by depositing an electrochromic material.

Some embodiments include a method of making an electrochromic optical system, the method including depositing a first nanostructured layer over a first substrate, the first nanostructured layer comprising a first nanostructured material, depositing a second nanostructured layer over a second substrate, the second nanostructured layer comprising a second nanostructured material, depositing a first electrolyte over the first nanostructured layer, depositing a second electrolyte over the second nanostructured layer, and assembling the first substrate and the second substrate, thereby forming the electrochromic optical system.

In some embodiments, the method includes sintering the first electrolyte to the second electrolyte.

Some embodiments include a method of making an electrochromic optical system, the method including depositing a first nanostructured layer over a substrate, the first nanostructured layer including a first nanostructured material, depositing at least one electrolyte over the first nanostructured layer, depositing a transparent conductive layer over the at least one electrolyte, the second nanostructured layer including a second nanostructured material, and depositing a transparent conductive layer over the second nanostructured layer, thereby forming the electrochromic optical system.

Further embodiments are provided in the detailed description that follows and in the accompanying figures.

BRIEF DESCRIPTION OF THE DRAWINGS/FIGURES

The application includes the following figures. These figures depicts certain illustrative embodiments of various aspects of the invention. In some instances, the figures do not necessarily provide a proportional illustration of an actual embodiment of the invention, but may emphasize certain features for purposes of illustration. The figures are not intended to limit the scope of the claimed subject matter apart from an express indication to the contrary.

DETAILED DESCRIPTION OF THE INVENTION

Figure 1:
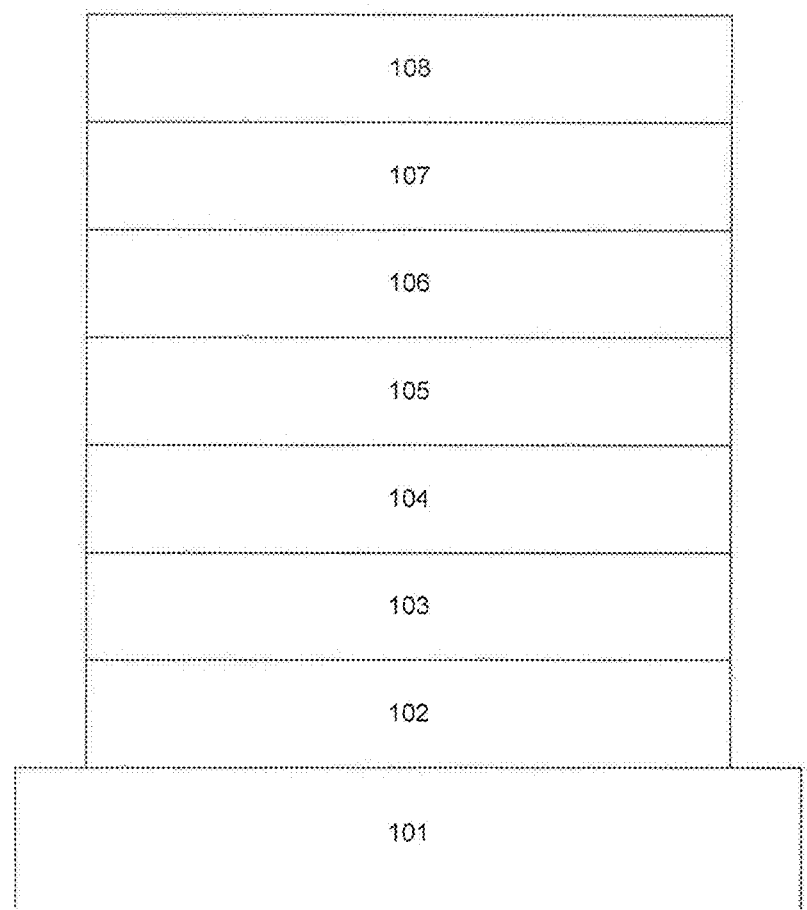
FIG. 1 depicts an electrochromic optical system according to one embodiment.

The following description recites various aspects and embodiments of the present invention. No particular embodiment is intended to define the scope of the invention. Rather, the embodiments merely provide non-limiting examples various compositions, apparatuses, and methods that are at least included within the scope of the invention. The description is to be read from the perspective of one of ordinary skill in the art; therefore, information well known to the skilled artisan is not necessarily included.

As used herein, the articles "a," "an," and "the" include plural referents, unless expressly and unequivocally disclaimed.

As used herein, the conjunction "or" does not imply a disjunctive set. Thus, the phrase "A or B is present" includes each of the following scenarios: (a) A is present and B is not present; (b) A is not present and B is present; and (c) A and B are both present. Thus, the term "or" does not imply an either/or situation, unless expressly indicated.

As used herein, the term "comprise," "comprises," or "comprising" implies an open set, such that other elements can be present in addition to those expressly recited.

As used herein, "top" means furthest away from a substrate, while "bottom" means closest to a substrate. Where a first layer is described as "disposed over" a second layer, the first layer is disposed further away from a substrate. There may be other layers between the first and second layer, unless it is specified that the first layer is "in contact with" the second layer. For example, an electrochromic layer may be described as "disposed over" the substrate, even though there are various layers in between the electrochromic layer and the substrate. When successive layers discussed herein are described as being disposed over each other, this is in reference to a single substrate regardless of whether or not a device may include more than one substrate. The substrate in which successive layers are disposed over will be apparent from the description and/or the figures. A layer that is disposed over a substrate or layer is not necessarily deposited over that substrate or layer. If a first layer is deposited over a second layer, the second layer must be present before the first layer is deposited over it.

As used herein the term "formed of an electrochromic material" means that an entity, such as a layer, is made of an electrochromic material. In other words, the core structure of the layer is an electrochromic material. While the layer is made of an electrochromic material, other components may be present on the layer. Other possible components include, but are not limited to, coatings, binders, etc.

Unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth a broad scope are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Until now, electrochromic eyeglass lenses have suffered from certain limitations. These include: the inability to block light across the visible spectrum in a cosmetically pleasing manner; the inability to provide a range of contrast or blocking that is expected by consumers; poor environmental stability and short material life cycles; lack of a frame-independent manufacturing process; and the difficulty of supplying the requisite electrical power to the electrochromic material in the lenses.

Moreover, despite the large amount of on-going research studies in the field of various electrochromic (EC) technologies, there is still a need for a compact and mechanically-robust solid-state electrochromic film stack, which can be easily applied on existing ophthalmic lens blank or semi-finished blank (SFB) or other surfaces that need controllable variable transmission performance. Such EC stack should operate under low voltage, thus not requiring large, heavy and aesthetically non-acceptable batteries. In addition, the variable-transmission EC stack should be fast-responding with a satisfactory dynamic range compared to the current available photochromic lenses and other switching technologies. Moreover, such a robust EC stack has a potential to be applied to any other large area transparent surfaces, e.g., architectural windows, glass roofs, car windshields, and other applications, requiring controllable transmission for energy-saving- and other purposes.

The EC film stack should also survive all post-processing steps performed on the surfaces that it is applied to. For instance, if applied to ophthalmic SFBs, it should survive the surfacing to different lens prescriptions, edging into different lens shapes and grooving steps. Furthermore, the solid EC film stack may be deposited (coated) on a single substrate, and thus, it is beneficial for reduction of the "bulkiness" of the final product (ophthalmic lens, motorcycle helmets, windows, etc.).

There is therefore a need to provide novel electrochromic materials that can at least partially solve some of these problems. The materials, apparatuses, and methods described herein are provided so as to address one or more of the above problems that have led to the slow development of commercially viable electrochromic eyeglass lenses.

Electrochromic Optical System Having Electrochromic Stack

Some embodiments include an electrochromic optical system comprising: an optical substrate; and an electrochromic stack disposed on the optical substrate, wherein the electrochromic stack comprises at least five ceramic layers disposed on each other; wherein at least one of the at least five ceramic layers comprises a nanostructured material.

In some embodiments, the electrochromic optical system comprises an optical substrate. As used herein, the term "optical substrate" refers to any substrate suitable for use as a lens or lens blank, or suitable for being formed into a lens or lens blank. In general, the optical substrate is a transparent material, meaning that it transmits at least 75%, or at least 80%, or at least 85%, or at least 90%, or at least 95%, or at least 97%, or at least 99% of visible light. The optical substrate is not limited to any particular material, so long as the material is suitable for use as an optical substrate. Suitable materials include, but are not limited to, glass, quartz, or a polymeric material, such as polycarbonate. The material can have any index of refraction suitable for use in optical applications. The substrate may also include other coatings or films, as are well known in the field of optics.

In some embodiments, the optical substrate is a lens, such as a lens for use in a pair of spectacles. As used herein, a "lens" is any device or portion of a device that causes light to converge or diverge (i.e., a lens is capable of focusing light), as well as a plano lens. A lens may be refractive or diffractive, or a combination thereof. A lens may be concave, convex, or planar on one or both surfaces. A lens may be spherical, cylindrical, prismatic, or a combination thereof. A lens may be made of optical glass, plastic, thermoplastic resins, thermoset resins, a composite of glass and resin, or a composite of different optical grade resins or plastics. It should be pointed out that within the optical industry a device can be referred to as a lens even if it has zero optical power (known as plano or no optical power). In this cases, the lens can be referred to as a "plano lens." A lens may be either conventional or non-conventional. A conventional lens corrects for conventional errors of the eye including lower order aberrations such as myopia, hyperopia, presbyopia, and regular astigmatism. A non-conventional lens corrects for non-conventional errors of the eye including higher order aberrations that can be caused by ocular layer irregularities or abnormalities. The lens may be a single focus lens or a multifocal lens such as a Progressive Addition Lens or a bifocal or trifocal lens.

In some other embodiments, the optical substrate is a semi-finished lens blank. As used herein, a "semi-finished lens blank" refers to structure having a finished outer surface, i.e., an outer surface suitable for use as one surface of a lens, and an opposing unfinished outer surface, i.e., an outer surface that is not (or not yet) suitable for use as one surface of a lens.

In certain embodiments, an electrochromic stack is disposed on the optical substrate. In some embodiments, the electrochromic stack is disposed directly on the optical substrate, meaning that it makes direct contact with the surface (e.g., finished surface) of the optical substrate. In some other embodiments, the electrochromic stack is disposed indirectly on the optical substrate, meaning one or more coatings, films, or other layers are disposed between the electrochromic stack and surface (e.g., finished surface) of the optical substrate.

As used herein, "electrochromic stack" refers to a multi-layer structure exhibiting electrochromic properties, meaning that it reversibly changes color upon the application of an electric potential, or reversibly changes color upon changing the magnitude of the electric potential applied. In some embodiments, the electrochromic stack is a structure that is transparent when no electric potential is applied to the stack, meaning that it transmits at least 75%, or at least 80%, or at least 85%, or at least 90%, or at least 95%, or at least 97%, or at least 99% of visible light. In some embodiments, the electrochromic stack is a structure that, when an electric potential is applied, blocks at least 10%, or at least 20%, or at least 30%, or at least 40%, or at least 50%, or at least 60%, or at least 70% of visible light. In some embodiments, the blocking is substantially uniform across the visible electromagnetic spectrum, while in some other embodiments it is not.

The electrochromic stack may comprise a plurality of layers. In some embodiments, the electrochromic stack may comprise at least three layers. In some embodiments, the electrochromic stack may comprise at least four layers. In some embodiments, the electrochromic stack may comprise at least five layers. For purposes of counting the number of layers in an electrochromic stack, the electrodes (e.g., the transparent conductors) are not counted as layers in an electrochromic stack.

In some embodiments, the electrochromic stack may comprise at least one layer comprising a nanostructured material. In some embodiments, the electrochromic stack may comprise at least two layers comprising a nanostructured material.

In some embodiments, the electrochromic stack comprises at least 5 ceramic layers. In some embodiments, the electrochromic stack comprises 5, or 6, or 7, or 8, or 9, or 10, or 11, or 12, or more than 12 ceramic layers. In some embodiments, the ceramic layers are disposed successively upon each other, such that there are no intervening layers. In some other embodiments, the electrochromic stack can include one or more (e.g., up to 5) non-ceramic layers disposed between the ceramic layers. In some embodiments, the non-ceramic layers are all composed of solid materials or semi-solid materials, such as glasses. In such embodiments, the non-ceramic materials can be metallic layers, such as gold, and the like.

The ceramic and non-ceramic materials used in the electrochromic stack need not be pure materials. Any material can include, for example, dopants, which may be optionally present in suitable amounts, for example, up to about 5 weight percent. The material layers can also include certain materials that are absorbed or adsorbed into the material. In addition, the material layers can contain a combination of materials, such as a combination of two ceramic materials.

In such combination layers, the layers can, in some embodiments, display a gradient, such that the top of the layer has a higher concentration of one of the combined materials, while the bottom of the layer has a higher concentration of another of the combined materials.

Any suitable ceramic material may be used. In some embodiments, the ceramic layers in the electrochromic stack are metal oxides. Suitable metal oxides include, but are not limited to, oxides of silicon, chromium, molybdenum, tungsten, cobalt, tantalum, gadolinium, indium, tin, nickel, iridium, or any combination thereof. The ceramic layers (and any non-ceramic layers) can have any suitable thickness. In some embodiments, the layers have a thickness of from 5 to 1000 nm, or from 5 to 500 nm, or from 5 to 200 nm, or from 5 to 150 nm, or from 5 to 100 nm, or from 10 to 1000 nm, or from 10 to 500 nm, or from 10 to 200 nm, or from 10 to 150 nm, or from 10 to 100 nm. In the multi-layer stack, the individual layers in the stack need not have the same thickness of other layers in the stack. In some embodiments, however, all of the layers in the stack have substantially the same thickness, meaning that their thicknesses relative to each other are no more than 25%, or no more than 20%, or no more than 15%, or no more than 10% different, based on the thickness of the least thick of the layers in the stack.

The layers in the stack can be deposited by any suitable means. These include but are not limited to spin-coating, dip-coating, knife-coating, spray coating, dye-slot coating, magnetron- or RF-sputtering, e-beam or thermal evaporation, layer-by-layer assembly, etc. (which are among those coating methods, in general, for both organic and inorganic materials). In some embodiments, at least one of the layers in the electrochromic stack, e.g., at least one of the ceramic layers, is deposited by a sol-gel process.

In some embodiments, at least one of the layers in the stack comprises a nanostructured material. In some embodiments, the term "nanostructured material" may mean a material having nanosized features, the nanosized features including at least one dimension measured in nanometers. Nanosized features include, but are not limited to, nanopores, nanospheres, nanograins, nanorods, nanoplatelets, and nanosized surface features, such as nanoridges or nanogrooves. In some embodiments, the nanosized feature may be nanoparticles. Preferably, a nanosized feature includes at least one dimension between 2 and 500 nanometers in size. More preferably, a nanosized feature includes at least one dimension between 50 and 200 nanometers in size.

In some embodiments, the term "nanostructured material" means a material having a grain structure, having grains with a grain size of from 1 to 50 nm, or from 1 to 25 nm. The nanostructured material can be formed by any suitable means. In some embodiments, the nanostructured material is formed by a sol-gel process. The nanostructured material can be composed of any suitable material. In some embodiments, the nanostructured material is an oxide of tungsten, nickel, iridium, molybdenum, or a combination thereof. In some embodiments, the nanostructured material is an oxide of tungsten, nickel, or a combination thereof. In some embodiments, the nanostructured material comprises a tungsten oxide and nickel oxide.

In some embodiments, the nanostructured material is a nanoporous material, meaning that the material has physical pores formed into the material, where the pores have a pore size of from 1 to 50 nm, or from 1 to 25 nm.

In some embodiments the nanostructured layer can be formed by layer-by-layer assembly process. For instance, nanoparticles of metal oxides with a specific surface modification or with appropriate binders can be deposited on a substrate via electrostatic molecular assembly.

The nanostructured material can be formed during the coating/deposition method or with a post-deposition step. As an example, glancing angle deposition (GLAD) and pulsed laser pyrolysis can yield a nanostructured metal oxide layer.

The layers within the stack can be arranged in any suitable manner, according to the knowledge of those of skill in the art. In some embodiments, the electrochromic stack at least comprises: a first layer composed of nickel oxide; a second layer composed of a combination of nickel oxide and tungsten oxide, and which is disposed on the first layer; and a third layer composed of tungsten oxide, which is disposed on the second layer. In some embodiments, at least one of the first layer, the second layer, or the third layer comprises a nanostructured material. In some embodiments, the second layer comprises a nanostructured material. In some embodiments, the second layer displays a gradient in composition, such that the ratio of nickel to tungsten is higher in portions of the layer lying closer to the first layer and the ratio of nickel to tungsten is lower in portions of the layer lying closer to the third layer.

In some further embodiments, the electrochromic stack comprises one or more additional layers disposed on the first layer, wherein at least one of the layers is a ceramic layer. For example, in some embodiments, a first gold layer or a first silica layer is disposed on the first layer, and a first indium tin oxide layer is disposed on the first gold layer or the first silica layer. In some such embodiments, the first silica layer is disposed on the first layer, and the first indium tin oxide layer is disposed on the first silica layer. Other layers can also be disposed on the stack or included within the stack. For example, in some embodiments, the first indium tin oxide layer is disposed on an optical substrate. In some embodiments, a first hard coat can be disposed on the first indium tin oxide layer. In some embodiments, a first antireflective coat is disposed on the first hard coat. Other coatings and layers can be included as well.

In some further embodiments, the electrochromic stack comprises one or more additional layers disposed on the third layer, wherein at least one of the layers is a ceramic layer. For example, in some embodiments, a second gold layer or a second silica layer is disposed on the third layer, and a second indium tin oxide layer is disposed on the second gold layer or the second silica layer. In some such embodiments, the second silica layer is disposed on the third layer, and the second indium tin oxide layer is disposed on the second silica layer. Other layers can also be disposed on the stack or included within the stack. For example, in some embodiments, the second indium tin oxide layer is disposed on an optical substrate. In some embodiments, a first hard coat can be disposed on the second indium tin oxide layer. In some embodiments, a first antireflective coat is disposed on the first hard coat. Other coatings and layers can be included as well.

FIG. 1 shows an electrochromic optical system 100 according to at least one embodiment. The figure shows an optical substrate 101 onto which is disposed, in order, an first indium tin oxide layer 102, a first silica layer 103, a nickel (II) oxide layer 104, a nickel oxide and tungsten oxide nanostructured layer 105, a tungsten oxide layer 106, a second silica layer 107, and a second indium tin oxide layer 108.

Figure 2:
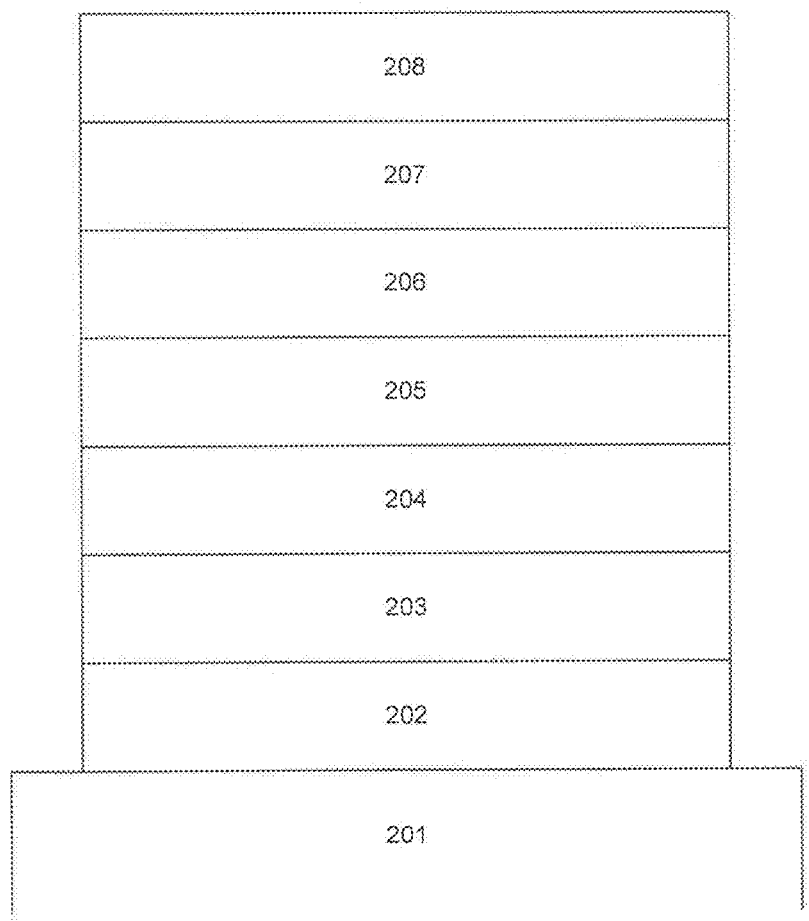
FIG. 2 depicts an electrochromic optical system according to one embodiment.

FIG. 2 shows an electrochromic optical system 200 according to at least one embodiment. The figure shows an optical substrate 201 onto which is disposed, in order, an first indium tin oxide layer 202, a first silica layer 203, a tungsten oxide layer 104, a nickel oxide and tungsten oxide nanostructured layer 105, a nickel (II) oxide layer 106, a second silica layer 107, and a second indium tin oxide layer 108.

Figure 3:
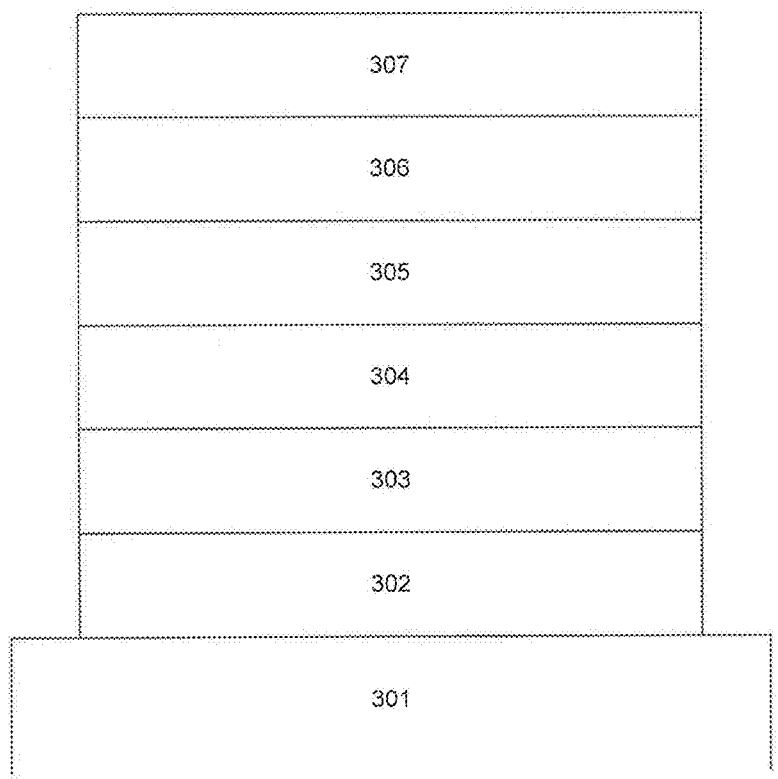
FIG. 3 depicts an electrochromic optical system according to one embodiment.

FIG. 3 shows an electrochromic optical system 300 according to at least one embodiment. The figure shows an optical substrate 301 onto which is disposed, in order, an first indium tin oxide layer 302, a nickel (II) oxide layer 303, a nickel oxide and tungsten oxide nanostructured layer 304, a tungsten oxide layer 305, a silica layer 306, and a second indium tin oxide layer 307.

Figure 4:
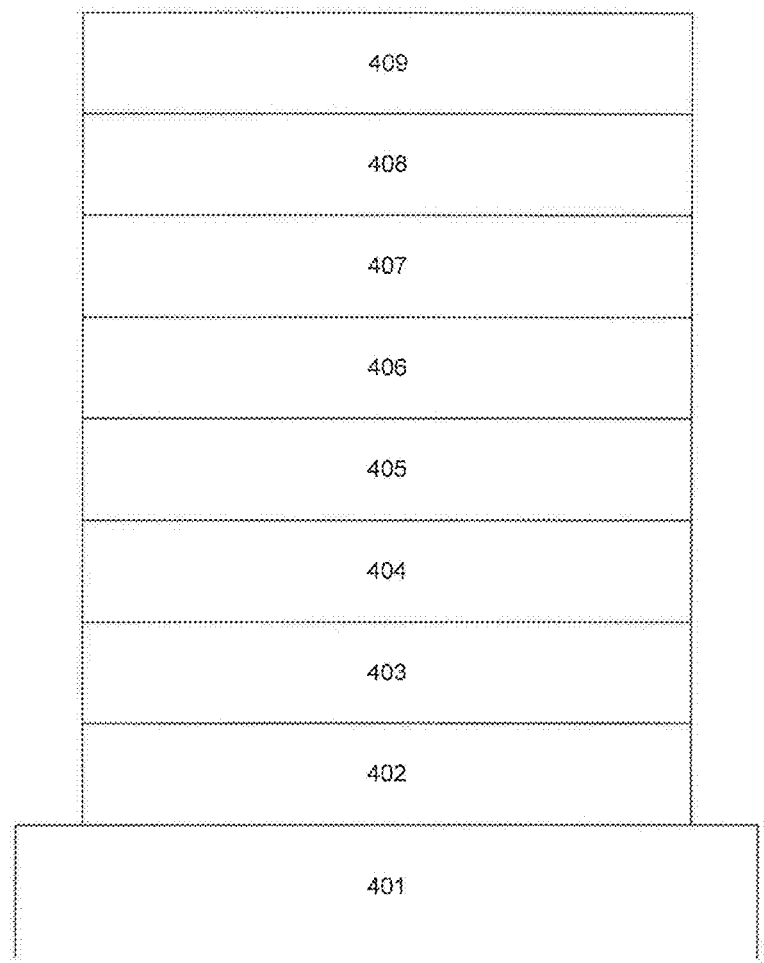
FIG. 4 depicts an electrochromic optical system according to one embodiment.

FIG. 4 shows an electrochromic optical system 400 according to at least one embodiment. The figure shows an optical substrate 401 onto which is disposed, in order, an first indium tin oxide layer 402, a first silica layer 403, a nickel (II) oxide layer 404, a nickel oxide and tungsten oxide nanostructured layer 405, a tungsten oxide layer 406, a second silica layer 407, a second indium tin oxide layer 408, and a hard coat 408.

Figure 5:
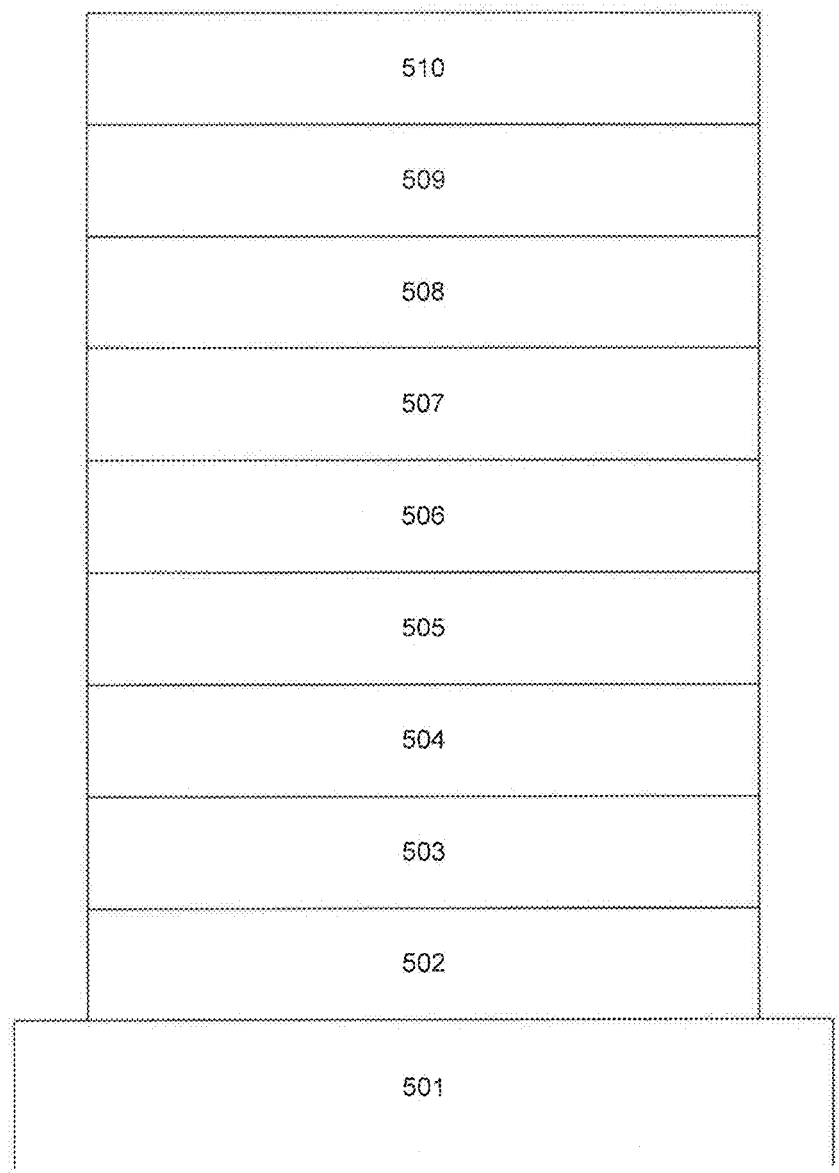
FIG. 5 depicts an electrochromic optical system according to one embodiment.

FIG. 5 shows an electrochromic optical system 500 according to at least one embodiment. The figure shows an optical substrate 501 onto which is disposed, in order, an first indium tin oxide layer 502, a first silica layer 503, a nickel (II) oxide layer 504, a nickel oxide and tungsten oxide nanostructured layer 505, a tungsten oxide layer 506, a second silica layer 507, a second indium tin oxide layer 508, a hard coat 508, and an antireflective coat 509.

Spectacles Comprising an Electrochromic Optical System

Some embodiments include a pair of spectacles comprising: a frame; and a first lens and a second lens, each of which is disposed in the frame; wherein one or both of the first lens or second lens is an electrochromic optical system, as described in the embodiments above. In some embodiments, the first lens and the second lens are both electrochromic optical systems, as described in the embodiments above.

In some embodiments, the pair of spectacles comprises various features that enable the delivery of an electric potential (and control thereof) to the electrochromic stack. Therefore, in some embodiments, the first lens and second lens comprise various electrical structures, such as wires and contacts, that serve to provide an electric potential to the electrochromic stack. In some embodiments, these wires or contacts are transparent. In some embodiments, the frame includes various wires and contacts adapted to deliver an electric potential to the electrochromic stack on one or both lenses. In some embodiments, the frame comprises a controller that is in electrical communication with the electrochromic stacks in one or both lenses. The controller is adapted to supply an electric potential to the electrochromic stacks (e.g., adapted to activate and/or deactivate the electrochromic stack), and thereby can control the degree of light blocking exhibited by the lenses. The pair of spectacles can also comprise a user input feature that is in electrical communication with the controller. In some embodiments, the user input feature allows the user to indicate his or her intent to activate the electrochromic feature of the lenses. In some embodiments, this input feature is a switch. In some other embodiments, it is a button, such as a physical button or a designated region of a screen, such as an LED or OLED screen. In some other embodiments, the pair of spectacles comprises a photosensor that is in electrical communication with the controller. The pair of spectacles can include any variety of other features, as are known in the art, including the use of electro-active optical structures in the lens, and other such features.

Method of Securing an Electrochromic Stack to an Optical Substrate

Some embodiments relate to a method of disposing one or more electrochromic layers on an optical substrate. The method may comprise: providing an optical substrate and a glass substrate, the glass substrate having one or more electro-chromic layers disposed on a first surface; and securing the glass substrate to the optical substrate, such that the first surface of the glass substrate faces the optical substrate; wherein the securing step comprises adhering the glass substrate to the optical substrate using an adhesive layer.

The method includes providing an optical substrate (as defined above). In some embodiments, the optical substrate is a lens. In some other embodiments, the optical substrate is a semi-finished lens blank. The optical substrate can be made of any suitable material. In some embodiments, however, it is made of a material that is not physically stable at higher temperatures, e.g., temperatures greater than 100° C., or greater than 120° C., or greater than 130° C., or greater than 140° C. In some such embodiments, the optical substrate is an organic material. In some embodiments, the optical substrate is an organic polymeric material. In some embodiments, the optical substrate comprises a polycarbonate material.

The method also includes providing a glass substrate. As used herein, "glass" refers to an amorphous inorganic solid material. It generally includes a major amount of silicon oxide, and can have minor amounts of other metal oxides, including, but not limited to, oxides of calcium, aluminum, magnesium, and sodium. Other oxides and dopants can be present as well.

One or more electrochromic layers are disposed on the glass substrate. The electrochromic material used in the one or more electrochromic layers is not limited to any particular type of electrochromic materials. In some embodiments, the electrochromic layers include an electrochromic stack, such as that described herein. In some other embodiments, the electrochromic layers include other electrochromic materials that are known in the art, including, but not limited to, tungsten oxide, nickel (II) oxide, zinc oxide, organic polymers, and certain organic-inorganic hybrid materials (described below). The electrochromic layers can be disposed onto the glass substrate by any methods known in the art. The selection of a method will depend on various factors, including, but not limited to, the identity of the electrochromic materials, the thickness of the layers, and any desired crystalline properties of the materials.

The disposing of the electrochromic layers on the glass substrate permits the electrochromic layers to be processed at temperatures much higher than could be used if the layers were disposed on a less thermally stable material, such as a polymeric material. Therefore, the use of the glass substrate provides greater flexibility in being able to process the electrochromic layers without concerns about damaging the underlying substrate. In some embodiments, the electrochromic layers are disposed onto the glass substrate using one or more bonding steps followed by an annealing step.

The glass substrate can have any suitable thickness. In some embodiments, the glass substrate has a thickness of from 25 to 500 microns, or from 50 to 250 microns, or from 75 to 200 microns.

The method includes securing the glass substrate having the electrochromic layers to the optical substrate. The surface of the glass substrate bearing the electrochromic layer faces the optical substrate. In some embodiments, the facing surfaces of the glass substrate and the optical substrate are curved surfaces. In some embodiments, these two surfaces have substantially the same radius of curvature, meaning that their radii of curvature are within 10%, or within 7%, or within 5% of each other. In some such embodiments, the surface of the optical substrate is a concave surface. In some other such embodiments, the surface of the optical substrate is a convex surface. The securing can be carried out by any suitable means. In some embodiments, the securing comprises using an adhesive.

In some embodiments, the adhesive is selected so as to have a refractive index that is suitable use in combination with the glass substrate and the optical substrate. In embodiments where the glass substrate and the optical substrate have approximately the same index of refraction (e.g., where the optical substrate is another glass substrate), the adhesive is selected so as to have substantially the same index of refraction as that of the two substrate materials, meaning that its index of refraction is no more than 20%, or no more than 15%, or no more than 10%, or no more than 5% different from that of either of the two substrate materials. In embodiments, where the glass substrate and the optical substrate have different indices of refraction, the adhesive can, in some such embodiments, be selected so as to have an index of refraction that lies between that of the two substrate materials. In some such embodiments, the index of refraction of the adhesive lies between 25% and 75%, or between 30% and 70%, or between 35% and 65%, or between 40% and 60%, or between 45% and 55% of the difference between the indices of refraction of the two substrate materials. In some other embodiments, the index of refraction of the adhesive matches that of the optical substrate, meaning that the index of refraction of the adhesive layer is within 25%, or within 20%, or within 15%, or within 10%, or within 5% of that of the optical substrate.

The resulting structure can be used, in some embodiments, as an electrochromic optical system. Therefore, in some embodiments, the optical substrate and/or the glass substrate can comprise various electrical structures, such as wires and contacts, that serve to provide an electric potential to the electrochromic layers. In some embodiments, these wires or contacts are transparent.

The substrates can, in some embodiments, be coated with various coatings in layers, as are known in the art. For example, the glass substrate or the optical substrate can have an antireflective coating or a hard coat.

Figure 6:
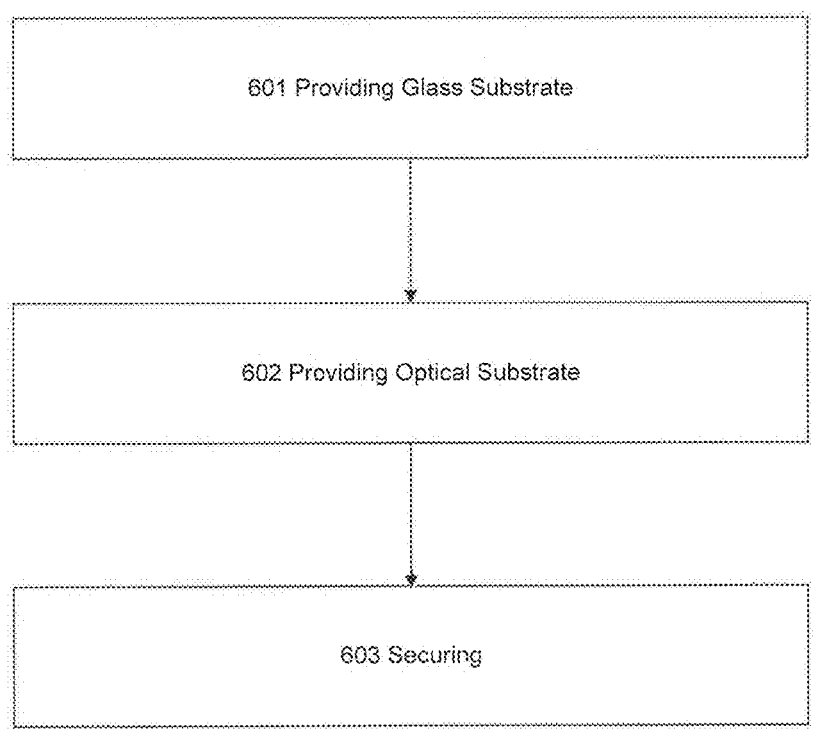
FIG. 6 depicts a flow chart depicting a method according to one embodiment.

FIG. 6 shows a flow chart for the method according to at least one embodiment. The method 600 includes providing a glass substrate having an electrochromic stack 601, providing an optical substrate, such as a semi-finished lens blank 602, and securing the glass substrate to the optical substrate 603.

Figure 7:
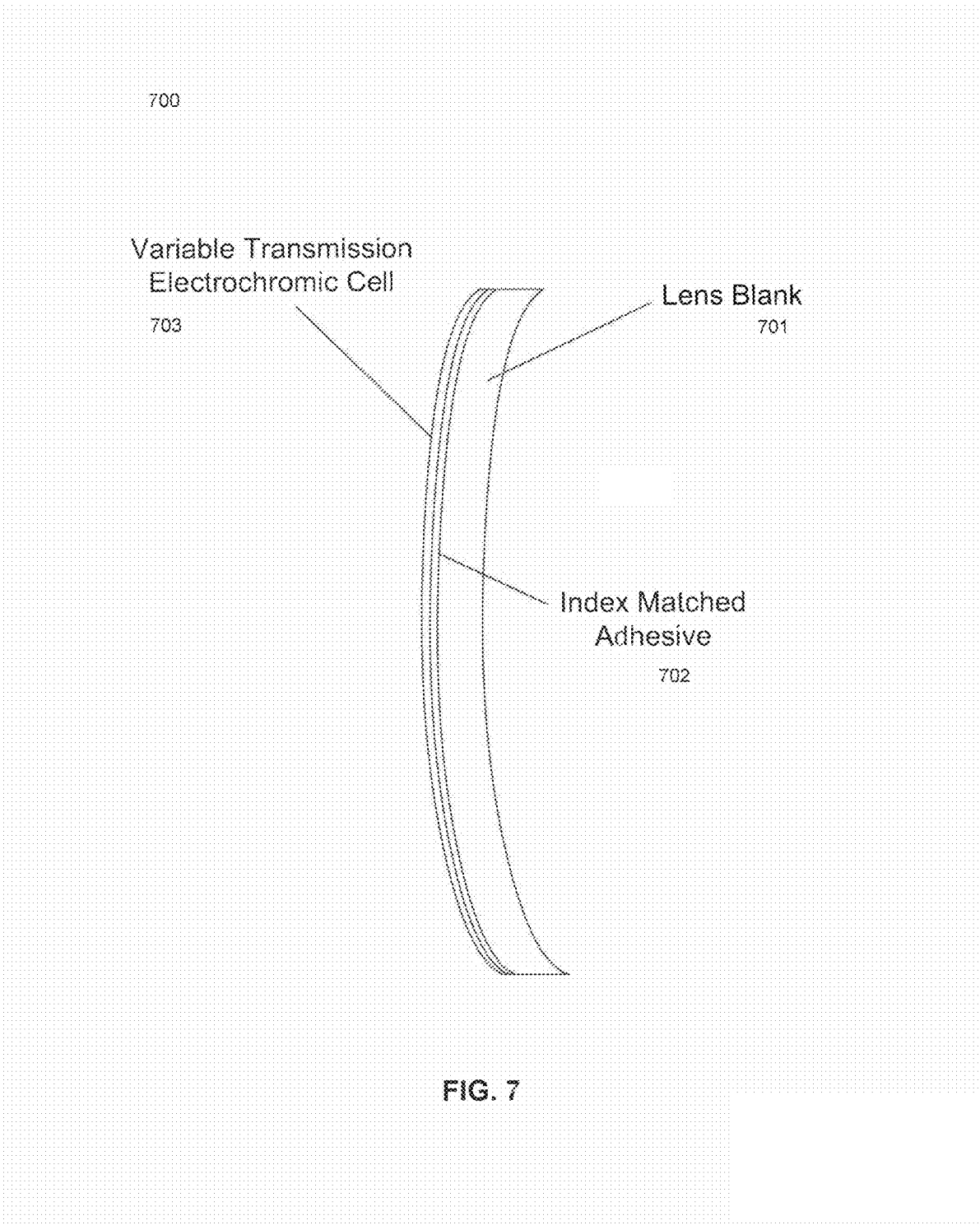
FIG. 7 depicts an optical system made by a method according to one embodiment.

FIG. 7 depicts an electrochromic optical system made according to one embodiment 700. The figure shows a lens blank 701, an index matched adhesive 702, and a variable transmission electrochromic cell 703.

Figure 8:
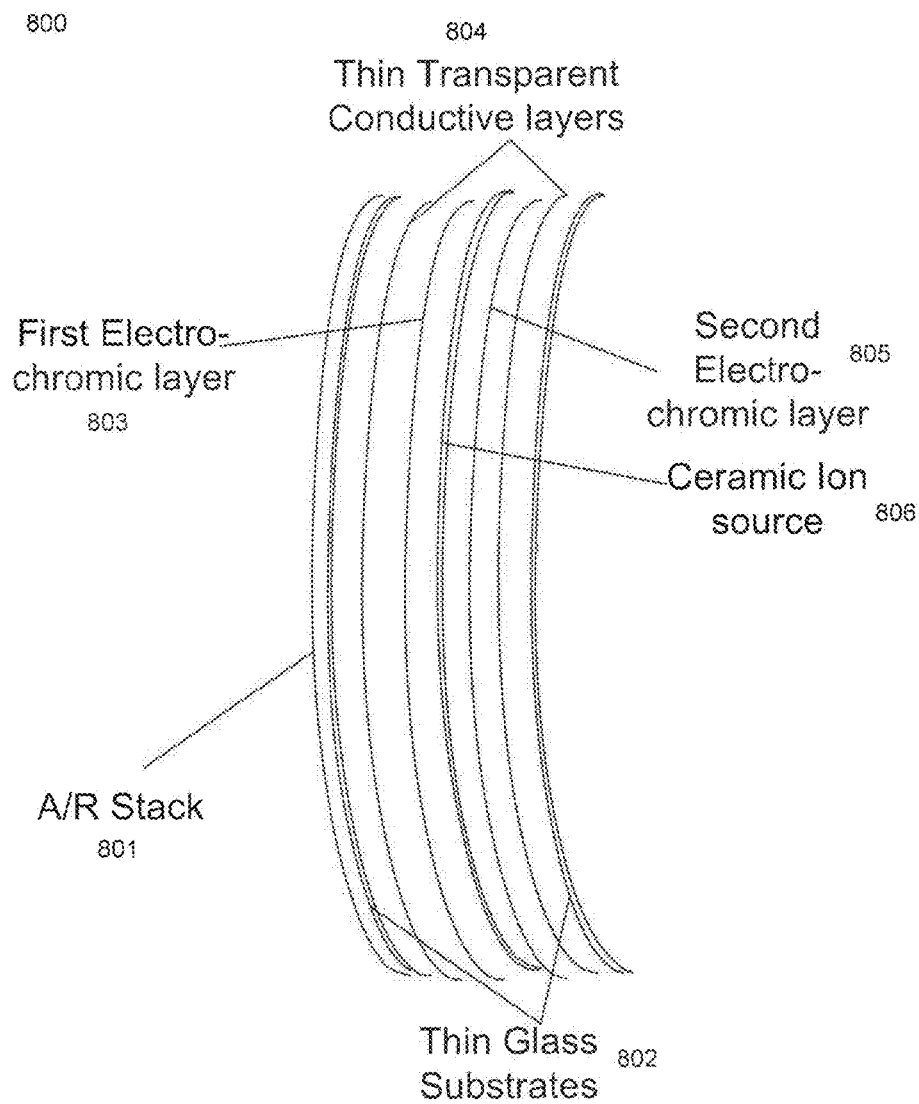
FIG. 8 depicts an optical system made by a method according to one embodiment.

FIG. 8 depicts an electrochromic optical system made according to one embodiment 800. The figure shows an antireflective stack 801, thin glass substrates 802, a first electrochromic layer 803, this transparent conductive layers 804, a second electrochromic layer 805, and a ceramic ion source 806.

Figure 9:
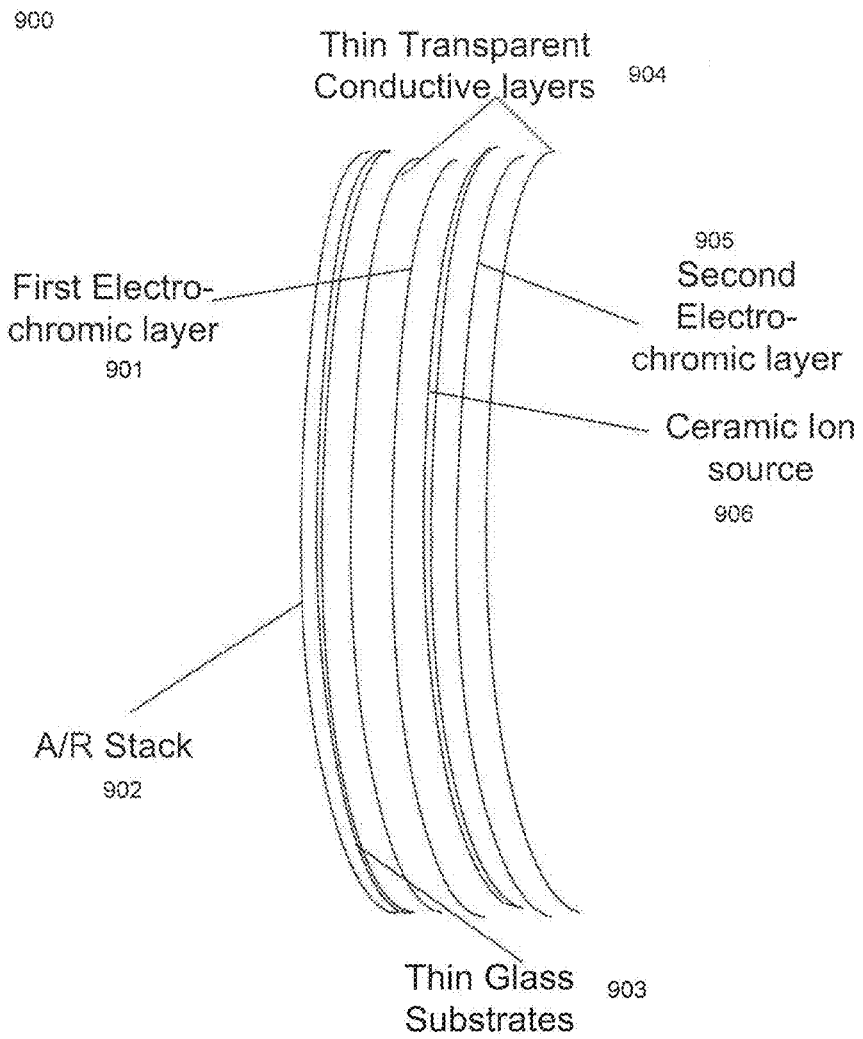
FIG. 9 depicts an optical system made by a method according to one embodiment.

FIG. 9 depicts an electrochromic optical system made according to one embodiment 900. The figure shows a first electrochromic layer 901, an antireflective stack 902, a thin glass substrate 903, this transparent conductive layers 904, a second electrochromic layer 905, and a ceramic ion source 906.

The ceramic ion sources 806/906 described above may be referred to as electrolytes and vice versa.

Hybrid Electrochromic Materials

Some embodiments include a hybrid electrochromic film. The hybrid film may comprise a nanostructured inorganic film, the film comprising an enhancer compound. As used in this section, the term "nanostructured" has the same meaning as that provided above. In some embodiments, the nanostructured films are also nanoporous films. Such films can be made by any suitable process, including, but not limited to, sol-gel processes.

The nanostructured inorganic film can have any suitable thickness. In some embodiments, the film has a thickness of from 5 to 500 nm, or from 5 to 200 nm, or from 5 to 100 nm, or from 5 to 50 nm.

The nanostructured inorganic film can be made of any suitable inorganic material. In some embodiments, the film comprises a metal oxide. In some such embodiments, the metal oxide is an oxide of tungsten, zirconium, vanadium, molybdenum, iridium, or combinations thereof. In some embodiments, the metal oxide is tungsten oxide. In some other embodiments, the metal oxide is zinc oxide.

The film comprises one or more enhancer compounds. These electrochromic enhancers are compounds that can, in some instances, enhance the coloration efficiency of the electrochromic material and compensate for any undesirable colors in the material or any bleaching that can occur. In some embodiments, the enhancer compounds are organic compounds. In some embodiments, the enhancer compounds are viologens, such as various salts of quaternized 4,4-bypyridine. In some other embodiments, the enhancer compounds are metal coordination complexes, such as transition metal polypyridyl complexes, metallophthalo-cyanines, polymeric viologens, and the like. In some other embodiments, the enhancer compounds are dye compounds, such as Prussian blue. In some other embodiments, the enhancer compounds are conductive polymers, such as poly(3,4-ethylenedioxythiophene) poly(styrene sulfonate) (PEDOT:PSS), polyanilines, or polypyrroles. Or, in some other embodiments, the enhancer compounds can be any combination of any of the above classes of compounds.

The enhancer compound can be introduced to the inorganic layer in any suitable manner. Suitable means of effecting such introduction include, but are not limited to, doping, adsorbing, absorbing, or by adding an additional the enhancer compounds as an additional thin film immediately adjacent to the inorganic layer. Such thin films can be deposited by any suitable coating process, including, but not limited to, spin coating, spraying, die slot coating, and gravure coating.

In some embodiments, the electrochromic film is disposed (e.g., deposited) on a thin flexible substrate. Suitable substrate materials include, but are not limited to, plastics, such as TAC, PSU, PPSU, and PEEK, and glass, such as Corning WILLOW glass.

The arrangement of materials is not limited to any particular arrangement of the hybrid material in an electrochromic stack. Further, in some embodiments, additional layers and materials can be included, for example, to change performance characteristics. Such changes include, altering the color of the stack, whether in the "bleached" or "colored" state of the device, improve the stability of the material, and improve the switching speed.

Figure 10:
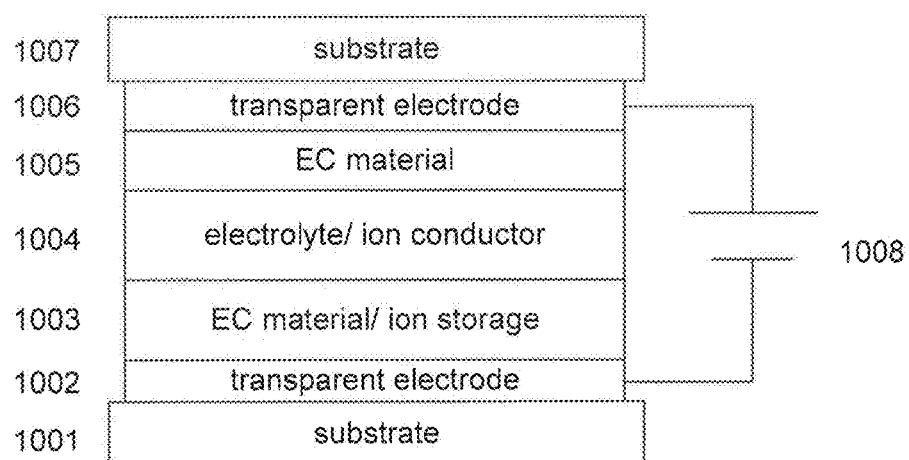
FIG. 10 depicts an electrochromic stack according to one embodiment.

FIG. 10 shows an example of an electrochromic stack 1000 according to at least one embodiment. The stack includes a first substrate 1001, a first transparent electrode 1002, a electrochromic/ion storage material (hybrid inorganic-organic material) 1003, an electrolyte/ion conductor 1004, an electrochromic material 1005, a second transparent electrode 1006, a second substrate 1007, and a source of an electric potential 1008.

Figure 11:
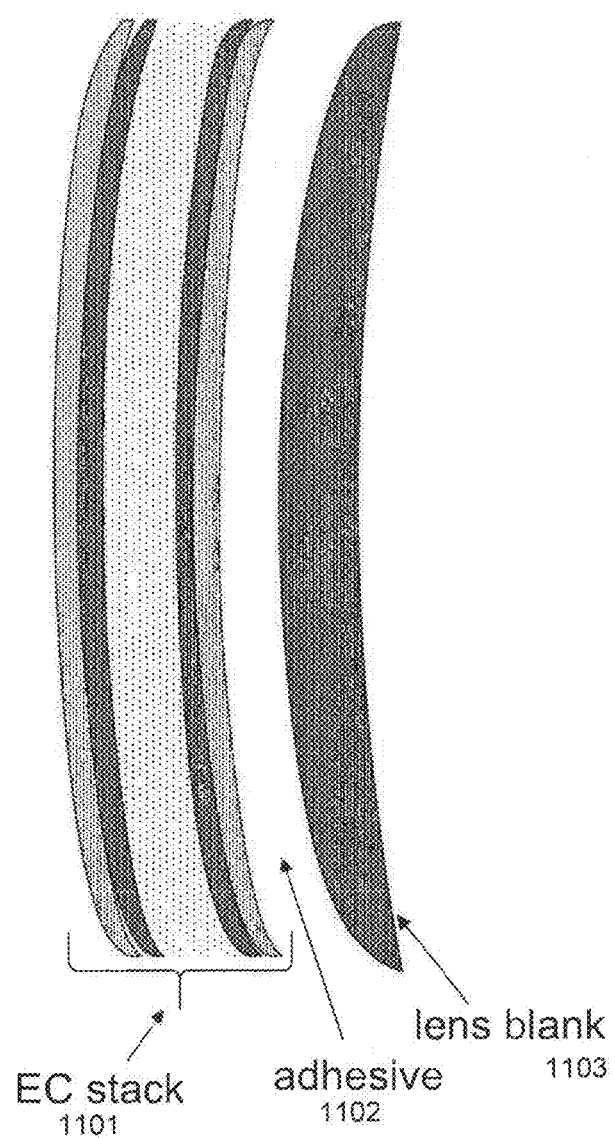
FIG. 11 depicts an optical system according to one embodiment.

FIG. 11 shows a lens having an electrochromic stack according to at least one embodiment 1100. The Figure shows an electrochromic stack 1101, an adhesive layer 1102, and a lens blank 1103.

Nanostructured Layers, Ion-Conducting Layers, and Methods of Making the Same

In some embodiments, an electrochromic stack includes at least one nanostructured layer. In some embodiments, an electrochromic stack includes at least one ion-conducting layer. In some embodiments, an electrochromic stack includes at least one nanostructured layer and at least one ion-conducting layer. In some embodiments, an electrochromic stack includes at least one nanostructured layer and at least one electrolyte. In some embodiments, an electrochromic stack includes at least one nanostructured layer, at least one electrolyte, and at least one ion-conducting layer. In some embodiments, an ion-conducting layer is deposited over a nanostructured layer. In some embodiments, an electrolyte is deposited over a nanostructured layer. In some embodiments, an ion-conducting layer is deposited over a nanostructured layer in direct contact with the nanostructured layer. In some embodiments, an electrolyte is deposited over a nanostructured layer in direct contact with the nanostructured layer. In some embodiments, at least one ion-conducting layer is deposited over each nanostructured layer within an electrochromic stack.

Nanostructured layers provide for a high surface area at the interfaces between layers within an electrochromic stack relative to an interface between flat surfaces. High surface area materials may provide an increased number of locations for ion exchange between two layers within an electrochromic stack and a higher rate of ion exchange between the layers, thus increasing the efficiency of an electrochromic device. High surface area electrochromic materials facilitate rapid switching times for an electrochromic device (i.e. the time required for the device to completely change from a first color and/or transparency to a second color and/or transparency), such as the electrochromic optical systems described herein. High surface area electrochromic materials also increase the response time of an electrochromic device. High surface area electrochromic materials also result in increased color/transparency change in thin layers. For example, a layer composed of an electrochromic material having a higher surface area will have a more significant color/transparency change when a charge is applied versus a layer having the same thickness and lower surface area electrochromic material. As such, high surface area materials result in a thinner electrochromic stack without sacrificing the speed or degree of color/transparency change for the stack.

An "electrolyte" or "ion source" as used herein is a material that generates ions in a device.

An "ion conducting layer" as used herein is a layer that transport ions from an electrolyte to an electrochromic layer. The ions are primarily generated within an electrolyte distinct from the ion-conducting layer.

The groups of materials suitable for use as electrolytes and ion-conducting layers may have some overlap. Whether a material is an electrolyte or an ion-conductor may depend upon the context of a particular device. For example, a material with a relatively low dissociation constant, i.e., a relatively poor electrolyte, may nevertheless function as a suitable electrolyte if it is the best electrolyte in the device, and such a device may work reasonably well. That same material, when used in a device that also includes an electrolyte having a significantly higher dissociation constant, may provide only a small fraction of the ions present in the device, and may in that context be considered an ion-conducting layer as opposed to an electrolyte. Lithium oxide based electrolytes and organic silica are examples of materials suitable for use as ion-conducting layers that may, in the proper context, be used as electrolytes. But, there are also materials suitable for use as an ion-conducting layer that do not have electrolytic properties.

Electrolyte materials that are very good at dissociating into positively and negatively charged ions (i.e. generating ions) may have other undesirable characteristics, such as poor refractive index matching relative to electrochromic layers. One or more ion-conducting layers may be used to compensate for the undesirable characteristics of some electrolyte materials. For example, a material with excellent electrolytic properties may have an index of refraction that is undesirably mismatched with the index of refraction of a desired electrochromic layer. A structure where the electrolyte is in contact with the electrochromic layer may result in undesirable reflection at the interface between the electrolyte and the electrochromic layer. Interposing an ion conducting layer between the electrolyte and the electrochromic layer, where the ion conducting layer has an index of refraction between that of the electrolyte and the electrochromic layer desirably allows for a series of smaller steps in the index of refraction, while still allowing the use of the desired electrolyte and electrochromic layer.

An ion-conducting layer facilitates the ion conductivity into and out of a nanostructured electrochromic layer. In some embodiments, an ion-conducting layer may facilitate the ion conductivity between an electrolyte and a nanostructured electrochromic layer and vice versa. By facilitating ion conductivity, the ion-conducting layer(s) decreases the switching time for an electrochromic device, such as the optical electrochromic systems described herein.

An ion-conducting layer may also serve to decrease internal reflection within an electrochromic stack by decreasing the change in refractive index ($\Delta n$) at the interface between two layers within a stack. When light crosses an interface in a device, some of the light may be reflected. There are two different types of reflection. One type is "total internal reflection." Total internal reflection can be described in terms of a "critical angle." Light hitting an interface at an angle to normal that is smaller than the critical angle will pass through the interface, while light hitting an interface at an angle to normal that is greater than the critical angle will be reflected. Where multiple layers with different refractive indices are involved, generally only the refractive index of the starting material and the refractive index of the final material matter in determining how much light escapes into the final material. The second type of reflection is Fresnel reflection. Fresnel reflection occurs even for light that hits an interface at an angle to normal smaller than the critical angle. Indeed, Fresnel refection occurs for light hitting an interface from a normal direction. The magnitude of Fresnel reflection at an interface for a normally incident light is $(n1-n2)^2/(n1+n2)^2$. When moving from a high index material to a low index material, total Fresnel reflection may be reduced by using a number of small steps down in the index of refraction, as opposed to a single large step down.

Reflection occurs at the interface of the first and second layers where there is a discrete change in refractive index ($\Delta n$). The larger the change in refractive index ($\Delta n$) the larger the amount of reflection that occurs at an interface. And the total amount of Fresnel reflection is less for a number of small steps down in index of refraction than it is for a single large step down, even if the total change in index is the same in both cases. From an optical point of view, a smooth transition in the refractive indices (i.e. small Δns) at the interface between layers is desirable.

By way of example only, if a nanostructured electrochromic layer having a refractive index of 2.0 is in contact with an electrolyte having a refractive index of 1.6 the Δn would be 0.4. If an ion-conducting layer having an index of refraction of 1.8 were placed between the nanostructured electrochromic layer (n=2.0) and the electrolyte (n=1.6), the Δn at the interfaces between: 1) the ion-conducting layer and the nanostructured electrochromic layer and 2) the ion-conducting layer and the electrolyte would be 0.2. The decrease in the maximum Δn (i.e. from 0.4 to 0.2) reduces reflection within the electrochromic stack.

In some embodiments, the refractive index of an ion-conducting layer has a value that is between the refractive index of the electrolyte and the refractive index of the nanostructured layer between which it is disposed. In some embodiments, the difference between the refractive index of a nanostructured layer and the refractive index of an ion-conducting layer that is in contact with the nanostructured layer is no greater than 0.4. In some embodiments, the difference between the refractive index of an ion-conducting layer and the refractive index of an electrolyte that is in contact with the ion-conducting layer is no greater than 0.4. In some embodiments, the difference between the refractive index of a nanostructured layer and the refractive index of an ion-conducting layer that is in contact with the nanostructured layer is no greater than 0.3. In some embodiments, the difference between the refractive index of an ion-conducting layer and the refractive index of an electrolyte that is in contact with the ion-conducting layer is no greater than 0.3.

In some embodiments, the Δn at every interface within an electrochromic stack is no greater than 0.4. In some embodiments, the Δn at every interface within an electrochromic stack is no greater than 0.3. Preferably, the Δn at every interface within an electrochromic stack is as small as possible. The smoothing of refractive indices between two layers within an electrochromic stack (e.g., a nanostructured layer and an electrolyte) may be accomplished by disposing any number of layers (e.g., ion-conducting layers) between them.

In some embodiments, one or more electrolytes may be chosen such that their refractive indices are similar to the refractive indices of one or more nanostructured layers in contact with the electrolyte(s). In such embodiments, optimization of the refractive indices of these materials may cause the selection of an electrolyte material that has less a than optimal ability dissociate into positively and negatively charged ions (i.e. generating ions). In such embodiments, the refractive index of the an electrolyte material may be chosen such that the difference between the refractive index of a nanostructured layer and the refractive index of an electrolyte that is in contact with the nanostructured layer is no greater than 0.4. In some embodiments, the refractive index of the electrolyte material may be chosen such that the difference between the refractive index of a nanostructured layer and the refractive index of an electrolyte that is in contact with the nanostructured layer is no greater than 0.3.

In some embodiments, the material of the ion-conducting layer(s) penetrates at least partially into the surface features of the nanostructured material of a nanostructured electrochromic layer. Depending on the method of making an ion-conducting layer, ions (e.g. Li+ ions) may penetrate inside the nanostructured material of a nanostructured electrochromic layer, and thus, further facilitate ionic conductivity (i.e. ionic transport) between an electrolyte and a nanostructured electrochromic layer. Preferably, the material of the ion-conducting layer(s) penetrates completely into the nanostructured material of a nanostructured electrochromic layer. For example, an ion-conducting layer may be coated so as to infiltrate spaces between nanorods present in a nanostructured electrochromic layer and preferably completely fills the spaces. The method of making the ion-conducting layer and the process conditions used to make it may influence the amount of penetration. In some embodiments, the electrochromic stack may have an ion conductivity between $10^{-1}$ S/cm and $10^{-7}$ S/cm. In some embodiments, an electrolyte may penetrate inside the nanostructured material of a nanostructured electrochromic layer.

FIGS. 12-15 illustrate various non-limiting embodiments of electrochromic stacks including at least one nanostructured layer. The nanostructured layer(s) described with respect to FIGS. 12-15 may be employed as the nanostructured layers in the embodiments discussed in FIGS. 1-11. Additionally, the ion-conducting layer(s) described with respect to FIGS. 12 and 13 may be utilized in the embodiments discussed in FIGS. 1-11.

Figure 12:
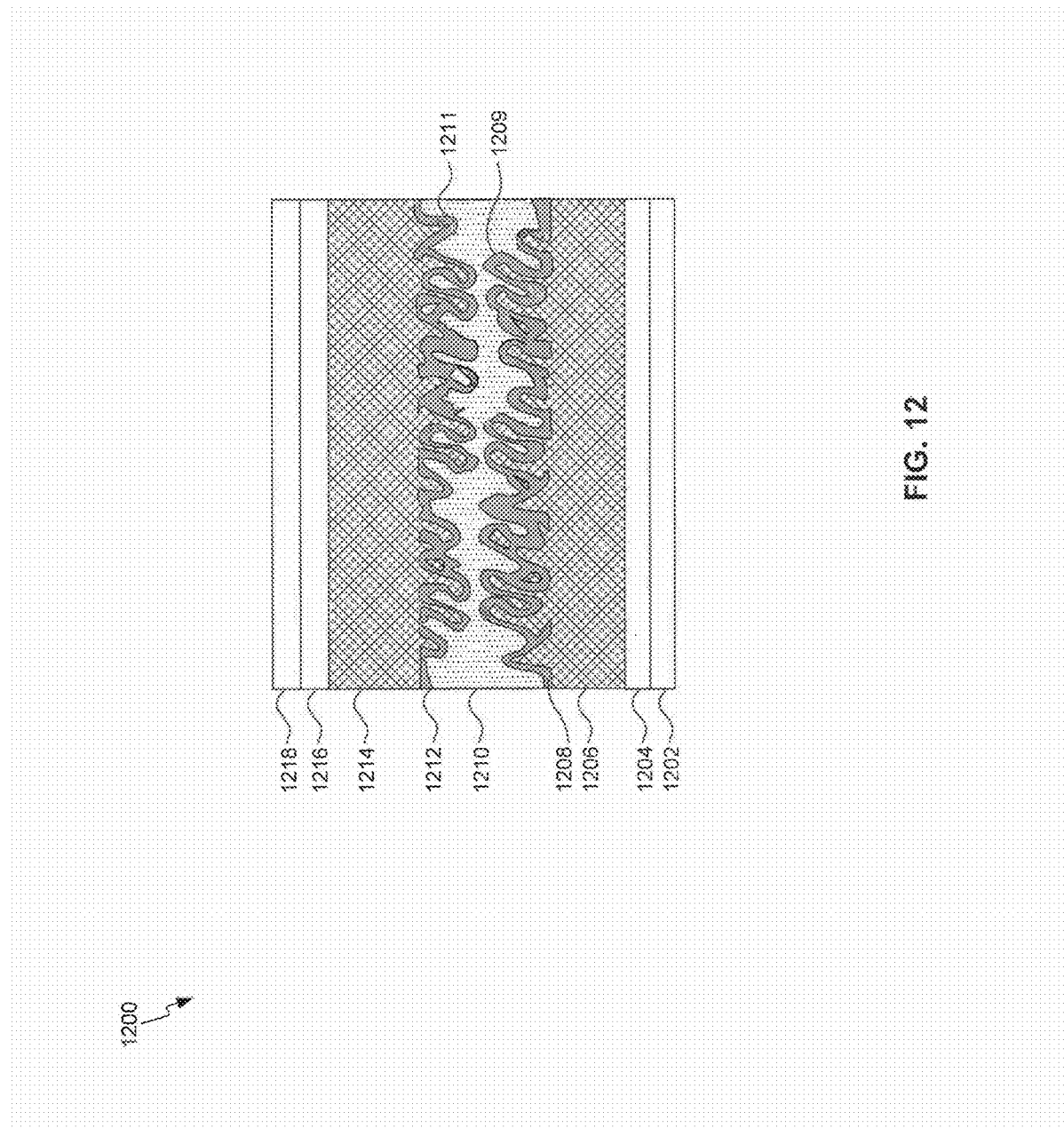
FIG. 12 depicts an electrochromic optical system having two nanostructured layers each coated with an ion-conducting layer according to an embodiment.

FIG. 12 shows an electrochromic optical system 1200 having an electrochromic stack according to an embodiment, electrochromic optical system 1200 including at least one ion-conducting layer coated on at least one nanostructured electrochromic layer. Electrochromic optical system 1200 may include a first substrate 1202 and a first transparent conductive layer 1204 disposed over first substrate 1202.

Examples of substrates include, but are not limited to, glass or plastic substrates, such as poly(ethylene terephthalate) (PET), poly(ethylene, 2,6-naphthalate) (PEN), polycarbonate (PC), polyether ether ketone (PEEK), poly(ether sulfone) (PES), polycyclic olefin, etc. In some embodiments, the substrate may be an optical substrate. The substrate may be transparent. The substrate may be rigid or flexible. Unless indicated otherwise, the substrates in each embodiment described herein may include a material selected from the above exemplary substrate materials.

Examples of transparent conductive layers include, but are not limited to, indium tin oxide (ITO), fluorine doped tin oxide (FTO), antimony doped tin oxide (ATO), aluminum-doped zinc oxide (AZO), zinc oxide (ZnO), conjugated polymers, and a silver nano-wire gird. Unless indicated otherwise, the transparent conductive layers in each embodiment described herein may include a material selected from the above exemplary materials for transparent conductive layers.

Electrochromic optical system 1200 may also include a first nanostructured electrochromic layer 1206 disposed over first transparent conductive layer 1204. In some embodiments, first nanostructured electrochromic layer 1206 is in direct contact with first transparent conductive layer 1204 as shown in FIG. 12. A first ion-conducting layer 1208 may be disposed over first nanostructured electrochromic layer 1206. In some embodiments, first ion-conducting layer 1208 is in direct contact with first nanostructured electrochromic layer 1206. In some embodiments, first ion-conducting layer 1208 may include a plurality of ion-conducting layers composed of the same or different ion conducting materials.

Electrochromic optical system 1200 may also include an electrolyte 1210 disposed over first ion-conducting layer 1208. In some embodiments, the electrolyte may be a solid-state electrolyte or gel electrolyte. The electrolyte can be of any of the following types, but not limited to: a solid polymer electrolyte, a nano-composite polymer electrolyte, or a hybrid electrolyte. Some embodiments include a solid electrolyte made of a polar polymer matrix, for example, but not limited to, polyvinylidene fluoride (PVDF), succinonitrile, or poly(ethylene oxide) (PEO) with salts (Li-salts, K-salts, Na-salts) and/or ionic liquids. Such an electrolyte can be applied by spin-coating or spraying from a solution. In the case of gel electrolytes, they can be applied as a liquid by dip-coating or spray coating or spin-coating methods, and then, "solidified" by UV exposure, thermal heating, or air exposure, for example. In some embodiments, the electrolyte may be a liquid electrolyte. In some embodiments, the electrolyte may be a ceramic electrolyte. Ceramic electrolytes included but are not limited to, lithium oxides or organic silica. Suitable lithium oxides include, but are not limited to, lithium niobate ($LiNbO_3$), lithium oxide (LiO), Li-doped tungsten oxide ($Li_yWOx$), and Li-doped nickel oxide ($Li_yNIOx$). In some embodiments, the "x" in the lithium based materials may be greater than or equal to 1 and less than or equal to 6 (i.e. $1 \leq x \leq 6$). In some embodiments, the "y" in the lithium based materials may be greater than or equal to 1 and less than our equal to 2 (i.e. $1 \leq y \leq 2$). The electrolyte may be referred to as an ion source. Unless indicated otherwise, the electrolyte in each embodiment described herein may include a material selected from the above exemplary electrolyte materials.

Preferably, the electrolyte is a solid or quasi-solid electrolyte. Solid or quasi-solid electrolytes increase the robustness of the electrochromic stack, thus increasing the likelihood that it will not crack or break under mechanical stresses. These mechanical stress may be due to grinding or shaping operations performed on a lens having an electrochromic stack disposed thereon. Additionally, there will be no chance of leakage of the electrolyte if solid or quasi-solid electrolytes are used.

As shown in FIG. 12, electrochromic optical system 1200 may also include a second ion-conducting layer 1212 disposed over electrolyte 1210 and a second nanostructured electrochromic layer 1214 disposed over second ion-conducting layer 1212. In some embodiments, second ion-conducting layer 1212 is in direct contact with second nanostructured electrochromic layer 1214. In some embodiments, second ion-conducting layer 1212 may include a plurality of ion-conducting layers composed of the same or different ion conducting materials. In some embodiments, first ion-conducting layer 1208 may be the same as second ion-conducting layer 1212. In some embodiments, first ion-conducting layer 1208 may be different from second ion-conducting layer 1212.

The ion-conducting layers described herein may be purely inorganic or inorganic-organic in nature. In some embodiments, the ion-conducting layers are lithium oxides. Exemplary materials for ion-conducting layers include, but are not limited to, lithium niobate ($LiNbO_3$), lithium oxide (LiO), Li-doped tungsten oxide ($Li_yWOx$), Li-doped nickel oxide ($Li_yNIOx$), organic silica, etc. In some embodiments, the "x" in the lithium based materials may be greater than or equal to 1 and less than or equal to 6 (i.e. $1 \leq x \leq 6$). In some embodiments, the "y" in the lithium based materials may be greater than or equal to 1 and less than our equal to 2 (i.e. $1 \leq y \leq 2$). In some embodiments, first ion-conducting layer 1208 and second ion-conducting layer 1212 may have a thickness of 1 nm to 500 nm. Unless indicated otherwise, the ion-conducting layer(s) in each embodiment described herein may include at least one material selected from the above exemplary materials for ion-conducting layers.

First and second ion-conducting layers 1208 and 1212 shown in FIG. 12 may be deposited using at least one of the flowing processes: a lithiation process, an process including immersion/soaking in a Li-based solution, a coating process including coating a thin layer of a Li-based compound by spin-coating, dip-coating, atomic layer deposition, sol-gel processing, electro-chemical deposition, or vacuum-deposition (e.g., sputtering, evaporation). In some embodiments, first and second ion-conducting layers 1208 and 1212 may be deposited using a layer-by-layer deposition process. As shown in FIG. 12, these processes may be used to coat a thin ion-conducting layer on nanostructured electrochromic layers. Also, as shown in FIG. 12, these processes may be used to create first and second ion-conducting layers 1208 and 1212 including a first top surface and a second top surface, 1209 and 1211 respectively, having surface topographies that conform with the surface topography of the nanostructured electrochromic layer on which they were coated.

Nanostructured electrochromic layers 1206 and 1214 include an electrochromic (i.e. electro-active) nanostructured material. The nanostructured electrochromic material may be an electrochromic oxide selected from metal oxides of Ti, V, Ni, Cr, Mn, Fe, Co, Rh, Ir, Ta, W, Nb, and Mo. In some embodiments, the nanostructured electrochromic material may include, but is not limited to, a materials selected from the group consisting of nickel oxide (NiO), iridium oxide ($Ir_2O_3$), molybdenum oxide ($MoO_3$), vanadium oxide ($V_2O_5$), etc. As known in the art, these oxides may deviate from the stoichiometric ratios, and may have electrochromic properties only at certain stoichiometric ratios. In some embodiments, the nanostructured electrochromic material is tungsten oxide (WOx). In some embodiments, the "x" in WOx is between 2.6 and 2.98, inclusive. In some embodiments, first nanostructured electrochromic layer 1206 and/or second nanostructured electrochromic layer may 1214 be formed of an electrochromic material. In some embodiments, the first electrochromic nanostructured layer and the second electrochromic nanostructured layer may have a thickness of 1 nm to 500 nm.

In some embodiments, nanostructured electrochromic layers may include an enhancer compound, the enhancer compound selected from the exemplary enhancer compounds discussed above. In some embodiments, the nanostructured electrochromic material may be a hybrid electrochromic (as described above) comprising a nanostructured inorganic film, the film comprising an enhancer compound.

In some embodiments, first nanostructured electrochromic layer 1206 may be the same as second nanostructured electrochromic layer 1214. In some embodiments, first nanostructured electrochromic layer 1206 may be different from second nanostructured electrochromic layer 1214.

Nanostructured electrochromic layers 1206 and 1214 may be deposited using one or more of the following processes: an oblique vacuum deposition process, a glancing angle deposition process, an electrophoresis process, an electrodeposition process, and an atomic layer deposition process. For example, glancing angle sputtering (angles 5-10°) may be used to create needle-like nanostructured metal oxide electrochromic layers. As another example, electrophoretic and electro-chemical depositions may be used to create nanostructured grains of metal oxide electrochromic layers. In some embodiments, first and second nanostructured electrochromic layers 1206 and 1214 may be deposited using a layer-by-layer deposition process. Unless indicated otherwise, the nanostructured electrochromic layers in each embodiment described herein may include a material selected from the above exemplary materials for nanostructured electrochromic layers and may be deposited using the exemplary processes discussed above for nanostructured electrochromic layers.

Electrochromic optical system 1200 may also include a second transparent conductive layer 1216 disposed over second nanostructured electrochromic layer 1214 and a second substrate 1218 disposed over second transparent conductive layer 1216. First and second transparent conductive layers 1204 and 1216 may be the same or different. Additionally, first and second substrates 1202 and 1218 may be the same or different.

As a non-limiting example, electrochromic optical system 1200 may include a first nanostructured electrochromic layer 1206 comprising WOx and a second nanostructured electrochromic layer 1214 comprising NiO, layers 1206 and 1214 being complimentary nanostructured electrochromic layers, treated appropriately with ion-conducting layers, 1208 and 1212, respectively.

In some embodiments, electrochromic optical system 1200 may be manufactured using the following method. The order of the steps listed below is exemplary. Some steps may be performed concurrently.

1) depositing first transparent conductive layer 1204 over first substrate 1202;
2) depositing first nanostructured electrochromic layer 1206 over first transparent conductive layer 1204;
3) depositing first ion-conducting layer 1208 over first nanostructured electrochromic layer 1206;
4) depositing second transparent conductive layer 1216 over second substrate 1218;
5) depositing second nanostructured electrochromic layer 1214 over second transparent conductive layer 1216;
6) depositing second ion-conducting layer 1212 over second nanostructured electrochromic layer 1214;
7) disposing electrolyte 1210 between first ion-conducting layer 1208 and second ion-conducting layer 1212 by:
   a) depositing electrolyte 1210 on first ion-conducting layer 1208, and/or
   b) depositing electrolyte 1210 on second ion-conducting layer 1212; and
8) assembling first substrate 1202 and second substrate 1218 having transparent conductive layers, ion-conducting layers, and nanostructured electrochromic layers deposited thereon, thereby forming electrochemical optical system 1200.

In some embodiments, first substrate 1202 and second substrate 1218 may be assembled first and then electrolyte 1210, in a liquid phase, may be injected between the assembled substrates. In some embodiments, a spacer may be used to create a void between first ion-conducting layer 1208 and second ion-conducting layer 1212, the void capable of receiving injected electrolyte 1210.

Figure 13:
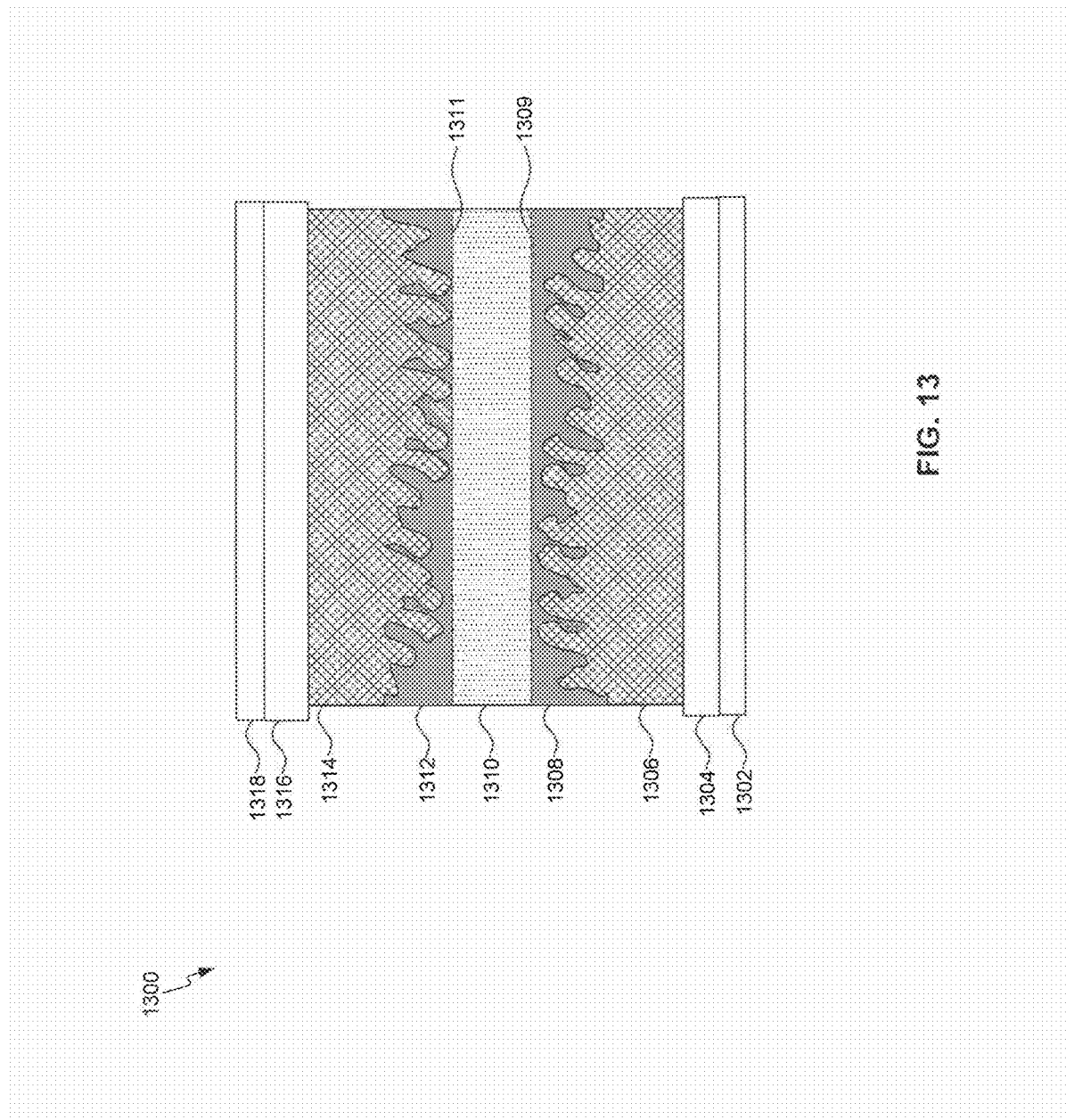
FIG. 13 depicts an electrochromic optical system having two nanostructured layers each filled in with an ion-conducting layer according to an embodiment.

FIG. 13 shows an electrochromic optical system 1300 having an electrochromic stack according to an embodiment, electrochromic optical system 1300 having at least one nanostructured electrochromic layer filled-in with at least one ion-conducting layer. Electrochromic optical system 1300 may include a first substrate 1302 and a first transparent conductive layer 1304 disposed over first substrate 1302.

Electrochromic optical system 1300 may also include a first nanostructured electrochromic layer 1306 disposed over first transparent conductive layer 1304. In some embodiments, first nanostructured electrochromic layer 1306 is in direct contact with first transparent conductive layer 1304 as shown in FIG. 13. A first ion-conducting layer 1308 may be disposed over first nanostructured electrochromic layer 1306. In some embodiments, first ion-conducting layer 1308 is in direct contact with first nanostructured electrochromic layer 1306. In some embodiments, first ion-conducting layer 1308 may include a plurality of ion-conducting layers composed of the same or different ion conducting materials. Electrochromic optical system 1300 may also include an electrolyte 1310 disposed over first ion-conducting layer 1308.

As shown in FIG. 13, electrochromic optical system 1300 may also include a second ion-conducting layer 1312 disposed over electrolyte 1310 and a second nanostructured electrochromic layer 1314 disposed over second ion-conducting layer 1312. In some embodiments, second ion-conducting layer 1312 is in direct contact with second nanostructured electrochromic layer 1314. In some embodiments, second ion-conducting layer 1312 may include a plurality of ion-conducting layers composed of the same or different ion conducting materials. In some embodiments, first ion-conducting layer 1308 may be the same as second ion-conducting layer 1312. In some embodiments, first ion-conducting layer 1308 may be different from second ion-conducting layer 1312.

First and second ion-conducting layers 1308 and 1312 shown in FIG. 13 may be deposited using at least one of the flowing processes: sol-gel processing, vacuum-deposition (e.g., sputtering or evaporation), atomic layer deposition, dip-coating, electro-chemical deposition, or electrophoretic deposition. In some embodiments, first and second ion-conducting layers 1308 and 1312 may be deposited using a layer-by-layer deposition process. As shown in FIG. 13, these processes may be used to deposit an ion-conducting layer on nanostructured electrochromic layers 1306 and 1314, the ion-conducting layers including top surfaces, 1309 and 1311 respectively, each having a surface topography that is smooth and flat.

Electrochromic system optical 1300 may also include a second transparent conductive layer 1316 disposed over second nanostructured electrochromic layer 1314 and a second substrate 1318 disposed over second transparent conductive layer 1316. First and second transparent conductive layers 1304 and 1316 may be the same or different. Additionally, first and second substrates 1302 and 1318 may be the same or different.

As a non-limiting example, electrochromic system optical 1300 may include a first nanostructured electrochromic layer 1306 comprising WOx and a second nanostructured electrochromic layer 1314 comprising NiO, layers 1306 and 1314 being complimentary nanostructured electrochromic layers, filled-in appropriately with ion-conducting layers, 1308 and 1312, respectively.

In some embodiments, electrochromic optical system 1300 may be manufactured using the following method. The order of the steps listed below is exemplary. Some steps may be performed concurrently.

1) depositing first transparent conductive layer 1304 over first substrate 1302;
2) depositing first nanostructured electrochromic layer 1306 over first transparent conductive layer 1304;
3) depositing first ion-conducting layer 1308 over first nanostructured electrochromic layer 1306;
4) depositing second transparent conductive layer 1316 over second substrate 1318;
5) depositing second nanostructured electrochromic layer 1314 over second transparent conductive layer 1316;
6) depositing second ion-conducting layer 1312 over second nanostructured electrochromic layer 1314;

7) disposing electrolyte 1310 between first ion-conducting layer 1308 and second ion-conducting layer 1312 by:
   c) depositing electrolyte 1310 on first ion-conducting layer 1308, and/or
   d) depositing electrolyte 1310 on second ion-conducting layer 1312; and
8) assembling first substrate 1302 and second substrate 1318 having transparent conductive layers, ion-conducting layers, and nanostructured electrochromic layers deposited thereon, thereby forming electrochemical optical system 1300.

In some embodiments, first substrate 1302 and second substrate 1318 may be assembled first and then electrolyte 1310, in a liquid phase, may be injected between the assembled substrates. In some embodiments, a spacer may be used to create a void between first ion-conducting layer 1308 and second ion-conducting layer 1312, the void capable of receiving injected electrolyte 1310.

Figure 14:
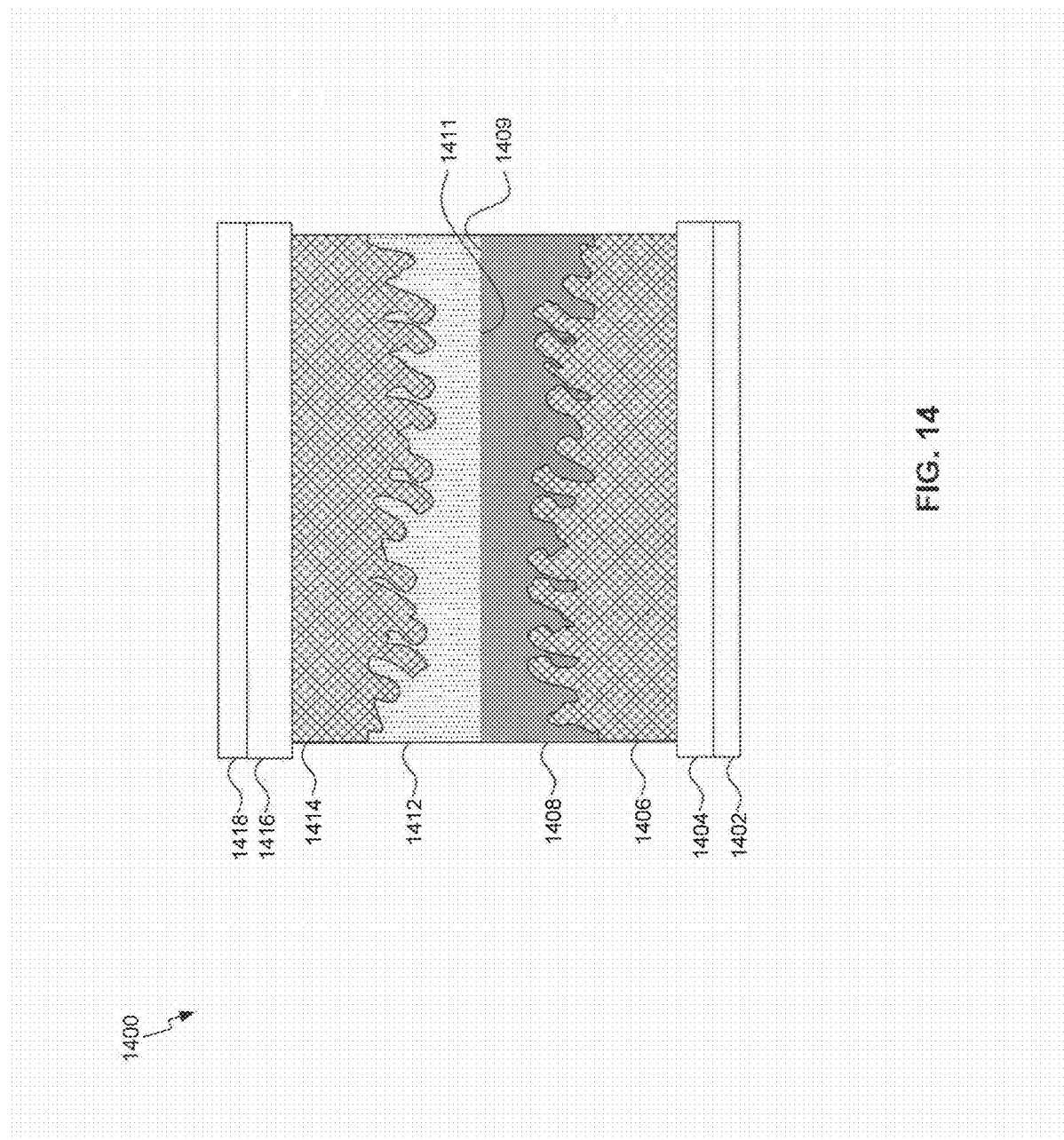
FIG. 14 depicts an electrochromic optical system having two nanostructured layers each filled in with an electrolyte according to an embodiment.

FIG. 14 shows an electrochromic optical system 1400 having an electrochromic stack according to an embodiment, electrochromic optical system 1400 having at least one nanostructured electrochromic layer filled-in with at least one electrolyte. Electrochromic optical system 1400 may include a first substrate 1402 and a first transparent conductive layer 1404 disposed over first substrate 1402.

Electrochromic optical system 1400 may also include a first nanostructured electrochromic layer 1406 disposed over first transparent conductive layer 1404. In some embodiments, first nanostructured electrochromic layer 1406 is in direct contact with first transparent conductive layer 1404 as shown in FIG. 14. A first electrolyte 1408 may be disposed over first nanostructured electrochromic layer 1406. In some embodiments, first electrolyte 1408 is in direct contact with first nanostructured electrochromic layer 1406. In some embodiments, first electrolyte 1408 may include a plurality of electrolyte layers composed of the same or different materials.

Electrochromic optical system 1400 may also include a second electrolyte 1412 disposed over first electrolyte 1408 and a second nanostructured electrochromic layer 1414 disposed over second electrolyte 1412. In some embodiments, second electrolyte 1412 is in direct contact with second nanostructured electrochromic layer 1414. In some embodiments, second electrolyte 1412 may include a plurality of electrolyte layers composed of the same or different materials. In some embodiments, first electrolyte 1408 may be the same as second electrolyte 1412. In some embodiments, first electrolyte 1408 may be different from second electrolyte 1412.

First and second electrolytes 1408 and 1412 shown in FIG. 14 may be deposited using at least one of the flowing coating processes: sol-gel processing, vacuum-deposition (e.g., sputtering or evaporation), dip-coating, electro-chemical deposition, or electrophoretic deposition. In some embodiments, first and second electrolytes 1408 and 1412 may be deposited using a layer-by-layer deposition process. As shown in FIG. 14, these processes may be used to deposit an electrolyte on nanostructured electrochromic layers, the electrolytes including top surfaces, 1409 and 1411 respectively, each having a surface topography that is smooth and flat. In some embodiments, first electrolyte 1408 may be in direct contact with second electrolyte 1412.

Electrochromic system optical 1400 may also include a second transparent conductive layer 1416 disposed over second nanostructured electrochromic layer 1414 and a second substrate 1418 disposed over second transparent conductive layer 1416. First and second transparent conductive layers 1404 and 1416 may be the same or different. Additionally, first and second substrates 1402 and 1418 may be the same or different.

As a non-limiting example, electrochromic optical system 1400 may include a first nanostructured electrochromic layer 1406 comprising WOx and a second nanostructured electrochromic layer 1414 comprising NiO, layers 1406 and 1414 being complimentary nanostructured electrochromic layers, filled-in appropriately with electrolytes, 1408 and 1412, respectively.

In some embodiments, electrochromic optical system 1400 may be manufactured using the following method. The order of the steps listed below is exemplary. Some steps may be performed concurrently.
1) depositing first transparent conductive layer 1404 over first substrate 1402;
2) depositing first nanostructured electrochromic layer 1406 over first transparent conductive layer 1404;
3) depositing first electrolyte 1408 over first nanostructured electrochromic layer 1406;
4) depositing second transparent conductive layer 1416 over second substrate 1418;
5) depositing second nanostructured electrochromic layer 1414 over second transparent conductive layer 1416;
6) depositing second electrolyte 1412 over second nanostructured electrochromic layer 1414;
7) assembling first substrate 1402 and second substrate 1418 having transparent conductive layers, electrolytes, and nanostructured electrochromic layers deposited thereon, thereby forming electrochromic optical system 1400.

In some embodiments, after the initial deposition of first and/or second electrolytes 1408/1412 (i.e. the filling-in of first nanostructured electrochromic layer 1406 and/or second nanostructured electrochromic layer 1414), a pre-baking step may be performed. After the pre-baking step, both substrates 1402 and 1418 are brought into contact and subjected to an additional baking step (or sintering), so that electrolytes 1408 and 1412 are fused together.

Figure 15:
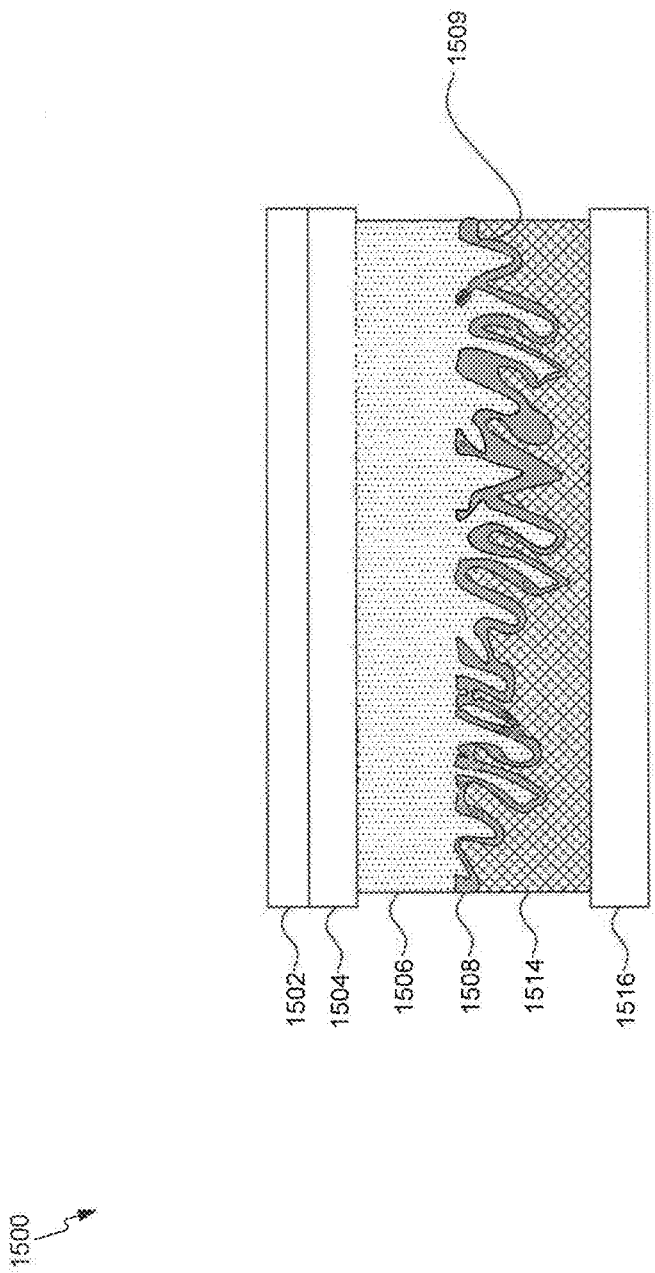
FIG. 15 depicts an electrochromic optical system having a single substrate according to an embodiment.
Figure 16:
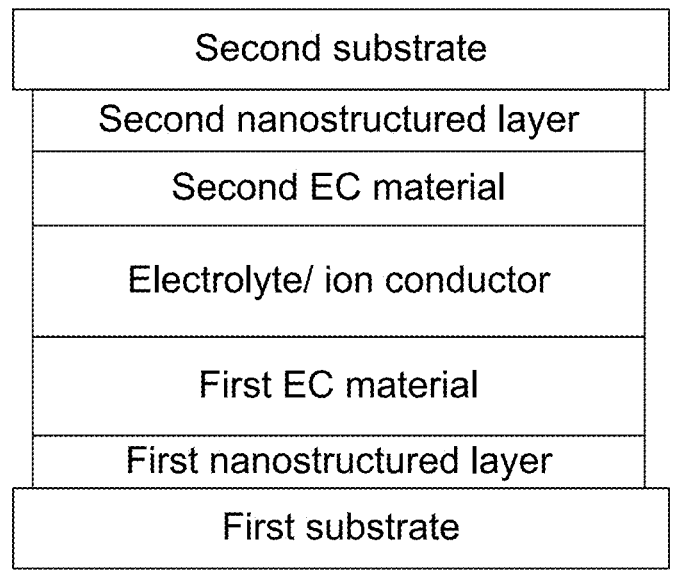
FIG. 16 depicts a schematic of an electrochromic stack according to an embodiment.

FIG. 15 shows an electrochromic optical system 1500 having an electrochromic stack according to an embodiment, electrochromic optical system 1500 having a single substrate and at least one nanostructured electrochromic layer coated with at least one electrolyte. Electrochromic optical system 1500 may include a substrate 1502 and a first transparent conductive layer 1504 disposed over substrate 1502.

Electrochromic optical system 1500 may also include a first nanostructured electrochromic layer 1506 disposed over first transparent conductive layer 1504. In some embodiments, first nanostructured electrochromic layer 1506 is in direct contact with first transparent conductive layer 1504, as shown in FIG. 15. An electrolyte 1508 may be disposed over first nanostructured electrochromic layer 1506. In some embodiments, electrolyte 1508 is in direct contact with first nanostructured electrochromic layer 1506. In some embodiments, electrolyte 1508 may include a plurality of electrolyte layers composed of the same or different materials.

Electrolyte 1508 shown in FIG. 15 may be deposited using at least one of the flowing processes: a lithiation process, a process including immersion/soaking in a Li-based solution, a coating process including coating a thin layer of a Li-based compound by spin-coating, dip-coating, atomic layer deposition, sol-gel processing, electro-chemical deposition, or vacuum-deposition (e.g., sputtering or evaporation). In some embodiments, electrolyte 1508 may be deposited using a layer-by-layer deposition process. As shown in FIG. 15, these processes may be used to coat a thin layer of electrolyte 1508 on first nanostructured electrochromic layer 1506. Also, as shown in FIG. 15, these processes may be used to create an electrolyte 1508 including a top surface 1509 having a surface topography that conforms with the surface topography of the nanostructured electrochromic layer on which it was coated.

Electrochromic optical system 1500 may also include a second nanostructured electrochromic layer 1514 disposed over electrolyte 1508. In some embodiments, for example, as shown in FIG. 15, second nanostructured electrochromic layer 1514 is complimentary to and has a surface topography that conforms with first nanostructured electrochromic layer 1506 and/or electrolyte 1508. Second nanostructured electrochromic layer 1514 may be deposited using at least one of the following processes: dip-coating, atomic layer deposition, sol-gel processing, electro-chemical deposition, electrophoretic deposition, or vacuum-deposition (e.g., sputtering or evaporation).

Electrochromic optical system 1500 may also include a second transparent conductive layer 1516 disposed over second nanostructured electrochromic layer 1514. First and second transparent conductive layers 1504 and 1516 may be the same or different.

As a non-limiting example, electrochromic optical system 1500 may include a first nanostructured electrochromic layer 1506 comprising WOx and a second nanostructured electrochromic layer 1514 comprising NiO, layers 1506 and 1514 being complimentary nanostructured electrochromic layers and first electrochromic layer 1506 being treated appropriately with electrolyte 1508.

In some embodiments, electrochromic optical system 1500 may be manufactured using the following method. The order of the steps listed below is exemplary. Some steps may be performed concurrently.

1) depositing first transparent conductive layer 1504 over substrate 1502;
2) depositing first nanostructured electrochromic layer 1506 over first transparent conductive layer 1504;
3) depositing electrolyte 1508 over first nanostructured electrochromic layer 1506;
4) depositing second nanostructured electrochromic layer 1514 over electrolyte 1508 (this step may include a single deposition step or may include multiple deposition steps); and
5) depositing second transparent conductive layer 1516 over second nanostructured electrochromic layer 1514, thereby forming electrochromic optical system 1500.

As a non-limiting example of step 4 in the above method, vacuum deposition or atomic layer deposition may be used to deposit at least a portion of second nanostructured electrochromic layer 1514 that conforms with the nano-structured topography underneath (i.e. the filling in of the surface topography of electrolyte 1508), and then a different process (sol-gel or electrophoretic deposition) may be used to further planarize nanostructured electrochromic layer 1514. As another non-limiting example of step 4, deposition of nanostructured electrochromic layer 1514 may be done using a single process, but with different processing conditions for 1) the initial deposition/filling-in of the nanostructured surface topography of electrolyte 1508 and 2) the planarizing of nanostructured electrochromic layer 1514.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the, hardware, methods and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. An electrochromic optical system comprising:
a first substrate;
a first nanostructured layer disposed on a first side of the first substrate, the first nanostructured layer comprising a first nanostructured material;
a first ion-conducting layer disposed on the first side of the first nanostructured layer;
a second substrate;
a second nanostructured layer disposed on a first side of the second substrate, the second nanostructured layer comprising a second nanostructured material;
a second ion-conducting layer disposed on the first side of the second nanostructured layer; and
a first electrolyte between the first ion-conducting layer and the second ion-conducting layer,
wherein the first substrate, the first nanostructured layer, the first ion-conducting layer, the first electrolyte, the second ion-conducting layer, the second nanostructured layer and the second substrate are stacked in this order, and
wherein the first substrate and the second substrate are assembled to form the electrochromic optical system.

2. The electrochromic optical system of claim 1, further comprising a second electrolyte over the first electrolyte, and wherein the first electrolyte and the second electrolyte are deposited.

3. The electrochromic optical system of claim 2, wherein each of the first electrolyte and the second electrolyte have a surface topography that is smooth and flat.

4. The electrochromic optical system of claim 2, wherein each of the first nanostructured layer, the first ion-conducting layer, the first electrolyte, the second ion-conducting layer, and the second nanostructured layer has a thickness of 5 to 1000 nm.

5. The electrochromic optical system of 1, further comprising a first transparent conductive layer over the first nanostructured layer and a second transparent conductive layer over the second nanostructured layer.

6. The electrochromic optical system of claim 5, wherein the second nanostructured layer is in direct contact with the second transparent conductive layer.

7. The electrochromic optical system of claim 5, wherein the first nanostructured layer is in direct contact with the first transparent conductive layer.

8. The electrochromic optical system of claim 7, wherein the first nanostructured material comprises a first electrochromic material.

9. The electrochromic optical system of claim 8, wherein the first electrochromic material is an electrochromic oxide selected from the group consisting of: tungsten oxide, nickel oxide, iridium oxide, molybdenum oxide, vanadium oxide, titanium oxide, chromium oxide, manganese oxide, iron oxide, cobalt oxide, rhodium oxide, tantalum oxide, niobium oxide, and combinations thereof.

10. The electrochromic optical system of claim 1, wherein at least one of the first nanostructured material and the second nanostructured material comprises at least one of: nanopores, nanospheres, nanograins, nanorods, nanoridges, nanoplatelets, and nanoparticles.

11. The electrochromic optical system of claim 1, wherein at least one of the first ion-conducting layer and the second ion-conducting layer comprises a material selected from the group consisting of: lithium oxide, lithium niobate, Li-doped tungsten oxide, Li-doped nickel oxide, organic silica, and combinations thereof.

12. The electrochromic optical system of claim 11, wherein the first ion-conducting layer in contact with the first nanostructured layer penetrates into the first nanostructured material.

13. The electrochromic optical system of claim 1, wherein the first ion-conducting layer is in contact with the first nanostructured layer.

14. The electrochromic optical system of claim 13, wherein the second ion-conducting layer in contact with the second nanostructured layer penetrates into the second nanostructured material.

15. The electrochromic optical system of claim 1, wherein the second ion-conducting layer is in contact with the second nanostructured layer.

16. The electrochromic optical system of claim 1, wherein a change in a refractive index at every layer within the electrochromic optical system is no greater than 0.4.

17. An electrochromic optical system comprising:
a first substrate;
a first nanostructured layer disposed on a first side of the first substrate, the first nanostructured layer comprising a first nanostructured material;
a first ion-conducting layer disposed on the first side of the first nanostructured layer;
a second substrate;
a second nanostructured layer disposed on a first side of the second substrate, the second nanostructured layer comprising a second nanostructured material;
a second ion-conducting layer disposed on the second side of the second nanostructured layer; and
a first electrolyte between the first ion-conducting layer and the second ion-conducting layer,
wherein the first substrate, the first nanostructured layer, the first ion-conducting layer, the first electrolyte, the second ion-conducting layer, the second nanostructured layer and the second substrate are stacked in this order,
wherein there are no layers between the first nanostructured layer, the first ion-conducting layer, the first electrolyte, the second ion-conducting layer, and the second nanostructured layer when these layers are stacked in this order, and
wherein the first substrate and the second substrate are assembled to form the electrochromic optical system.

18. The electrochromic optical system of claim 17, wherein the first nanostructured layer comprises a first electrochromic material, and the second nanostructured layer comprises a second electrochromic material.

19. The electrochromic optical system of claim 18, wherein the first ion-conducting layer has an index of refraction between the index of refraction of the first electrolyte and the index of refraction of the first electrochromic material, and the second ion-conducting layer has an index of refraction between the index of refraction of the first electrolyte and the index of refraction of the second electrochromic material.

* * * * *